US008563629B2

(12) United States Patent
Prince et al.

(10) Patent No.: US 8,563,629 B2
(45) Date of Patent: Oct. 22, 2013

(54) MASTER BATCH METHOD WITH OPTIMIZED FILLER

(75) Inventors: Jack Raymond Prince, West Bountiful, UT (US); Jared L. Sommer, North Salt Lake City, UT (US)

(73) Assignee: Revolutionary Plastics, LLC, Las Vegas, NV (US)

( * ) Notice: Subject to any disclaimer, the term of this patent is extended or adjusted under 35 U.S.C. 154(b) by 495 days.

(21) Appl. No.: 12/790,944

(22) Filed: May 31, 2010

(65) Prior Publication Data

US 2011/0130501 A1 Jun. 2, 2011

Related U.S. Application Data

(63) Continuation-in-part of application No. 12/565,097, filed on Sep. 23, 2009.

(51) Int. Cl.
*C08J 3/20* (2006.01)

(52) U.S. Cl.
USPC .......................................... 523/351; 524/443

(58) Field of Classification Search
USPC .......................................... 523/351; 524/443
See application file for complete search history.

(56) References Cited

U.S. PATENT DOCUMENTS

| | | |
|---|---|---|
| 3,981,840 A | 9/1976 | Yamamoto et al. |
| 4,013,616 A | 3/1977 | Wallace |
| 4,243,575 A | 1/1981 | Myers et al. |
| 4,661,533 A | 4/1987 | Stobby |
| 4,968,463 A | 11/1990 | Levasseur |
| 5,302,634 A | 4/1994 | Mushovic |
| 5,338,609 A | 8/1994 | Ondrus et al. ................ 428/402 |
| 5,366,365 A | 11/1994 | Sullivan et al. |
| 5,369,147 A | 11/1994 | Mushovic |
| 5,508,315 A | 4/1996 | Mushovic |
| 5,552,455 A | 9/1996 | Schuler et al. |
| 5,604,266 A | 2/1997 | Mushovic |
| 5,851,469 A | 12/1998 | Muller et al. |
| 5,886,078 A | 3/1999 | Sullivan et al. |
| 6,242,098 B1 | 6/2001 | Styron et al. |
| 6,269,952 B1 | 8/2001 | Watt et al. .......................... 209/3 |
| 6,344,268 B1 | 2/2002 | Stucky et al. |
| 6,362,252 B1 | 3/2002 | Prutkin |
| 6,583,217 B1 | 6/2003 | Li et al. |
| 6,669,773 B2 | 12/2003 | Malloy et al. |
| 6,695,902 B2 | 2/2004 | Hemmings et al. |
| 6,767,399 B2 | 7/2004 | Peev et al. |
| 6,916,863 B2 | 7/2005 | Hemmings et al. |
| 7,241,818 B2 | 7/2007 | Hemmings et al. |
| 7,589,145 B2 | 9/2009 | Brant et al. |
| 8,106,105 B2 | 1/2012 | Cernohous ........................ 521/83 |
| 2002/0040084 A1 | 4/2002 | Colmar et al. |
| 2002/0123553 A1 | 9/2002 | Sullivan et al. |
| 2002/0124775 A1 | 9/2002 | Hemmings et al. |
| 2002/0171164 A1 | 11/2002 | Halterbaum et al. |
| 2002/0185769 A1 | 12/2002 | Hasegawa et al. |
| 2003/0032707 A1 | 2/2003 | Hemmings et al. |
| 2004/0144287 A1 | 7/2004 | Tardif et al. |
| 2004/0266933 A1 | 12/2004 | Friedman et al. |
| 2005/0133960 A1 | 6/2005 | Keller et al. |
| 2005/0171243 A1 | 8/2005 | Hemmings et al. |
| 2005/0192403 A1 | 9/2005 | Nosker |
| 2006/0020067 A1* | 1/2006 | Brant et al. .................... 524/236 |
| 2006/0058427 A1 | 3/2006 | O'Neill et al. |
| 2006/0099405 A1 | 5/2006 | Guiselin et al. |
| 2007/0051277 A1 | 3/2007 | Hill et al. |
| 2007/0054998 A1 | 3/2007 | Harashina |
| 2007/0142534 A1 | 6/2007 | Moad et al. |
| 2008/0029925 A1 | 2/2008 | Brown |
| 2008/0110374 A1 | 5/2008 | Hill et al. |
| 2008/0114112 A1 | 5/2008 | Hemmings et al. |
| 2008/0119578 A1 | 5/2008 | Prince |
| 2008/0131344 A1 | 6/2008 | Hill et al. |
| 2008/0139704 A1 | 6/2008 | Gregory et al. |
| 2009/0130443 A1 | 5/2009 | Lustiger ........................ 264/142 |
| 2009/0258777 A1 | 10/2009 | Tardif et al. |
| 2011/0071252 A1 | 3/2011 | Prince et al. ................... 524/567 |
| 2011/0130501 A1 | 6/2011 | Prince et al. ................... 524/147 |

FOREIGN PATENT DOCUMENTS

| | | |
|---|---|---|
| AU | 2009200846 | 3/2009 |
| CN | ZL 200680015398 | 12/2011 |
| WO | WO2009136185 | 11/2009 |

OTHER PUBLICATIONS

International Search Report for PCT/US10/49504, mailed Jan. 6, 2011.
Written Opinion for PCT/US10/49504, mailed Jan. 6, 2011.
International Search Report for PCT/US11/38419, mailed Sep. 29, 2011.
Written Opinion for PCT/US11/38419, mailed Sep. 29, 2011.
Arukalam, et al., "Effects of Filler Loading on Some Mechanica Properties of Calcite-Filled Low Density Polyethylene Composites", Department of Polymer and Textile Engineering, Federal University of Technology, International Journal of Academic Research, vol. 3, No. 5., Sep. 2011, I Part.
A. Zaeni et al., "Colour control in fly ash as a combined function of particle size and chemical composition", Fuel 89 (2010) 399-404.
Wong & Truss "Effect of Flyash Content and Coupling Agent on the Mechanical Properties of Flyash-Filled Polypropylene", Composites Science and Technology 52 (1994), 361-368.
Schut, "Fly-Ash Fille Stages a Comeback" Article, Plastics Technology, Sep. 1999 Issue (2 pgs).
Nath et al., "Novel Observations on Kinetics of Nonisothermal Crystallization in Fly Ash Filled Isotactic-Polypropylene Composites", Published online Oct. 7, 2009 in Wiley InterScience, Journal of Applied Polymer Science, vol. 115, 1510-1517 (2010).

(Continued)

*Primary Examiner* — Edward Cain
(74) *Attorney, Agent, or Firm* — Hayes Soloway PC

(57) ABSTRACT

The particle size distribution of a first fly ash is compared to an ideal particle size distribution that was empirically developed to provide a resin melt with a lower viscosity as more fly ash is added. A second fly ash material is similarly compared to the ideal curve and then is blended or optimized to provide an optimum filler for use with a suitable resin or similar material. The blended optimum filler is combined with a resin, an acid scavenger and an anti-oxidant to form a master batch which is available for mixing with other resins to form a material that is processed into a final product. Additional additives may be added for, among other things, foaming and coloration.

18 Claims, 18 Drawing Sheets

(56) References Cited

OTHER PUBLICATIONS

Bandyopadhyay et al., "Advanced utilization of as received and near whitened fly ash in polypropylene polymer to improve mechanical, notched impact and whiteness colour properties", Int J Plast Technol (2010) 14 (Suppl 1): S51-56.

Shoup, Chevron Phillips Chemical Company LP, "Injection Moulding Fractional Melt Index, High Density Polyethylene Materials", (17 pgs), (Date Unknown).

Murthy et al., "In situ synthesis of nanoclay filled polyethylene using polymer supported metallocene catalyst system" article, Quimica Nova, vol. 34, No. 7, Sao Paulo 2011.

"New plant makes additives from power station waste", Compounding World, Oct. 2009 (1 pg article).

Xanthos, "Functional Fillers for Plastics", Wiley-VCH Verlag GmbH & Co. KGaA, (89 pgs), Copyright 2005.

Polyolefin Wikipedia Article (2 pgs) http://en.wikipedia.org/wiki/Polyolefin, May 2, 2011 last modified on Wikipedia.

Felthouse et al., "Maleic Anhydride, Maleic Acid, and Fumaric Acid" submitted Apr. 26, 2001.

"Wood flour as a low-cost reinforcing filler for polyethylene: studies on mechanical properties" Abstract (2 pgs) (Date Unknown).

Rohatgi et al., "Compressive and ultrasonic properties of polyester/fly ash composites", J Mater Sci (2009) 44:1485-1493.

A. Brent Strong, "Plastics Materials and Processing", Third Edition, (21 pgs), $3^{rd}$ Edition, Copyright 2006.

A. Brent Strong, "Fundamentals of Composites Manufacturing Materials, Methods, and Applications", Second Edition, (4 pgs) $2^{nd}$ Edition, Copyright 1996.

Heat Transfer—Japanese Research, vol. 36 Issue 7, Oct. 17, 2007, Wiley Periodicals, 3 Abstracts (3 pgs).

Srivastava et al., "Tensile and fracture properties of epoxy resin filled with flyash particles", Journal of Materials Science 25 (1990) 3513.

Fujimo et al., "Experimental Investigation on the Thermal Conductivity Measurement of the Fly Ash Dispersed Plastic Composite Using Guarded Hot Plate Apparatus", 2007.

Melt Mass Flow and Melt Volume Flow Rate—ASTM D1238: IDES—The Plastics Web (2 pgs) http://www.ides.com/property_descriptions/ASTMD1238.asp (Date Unknown).

ASTM D1238—10 Standard Test Method for Melt Flow Rates of Thermoplastics by Extrusion Plastometer—http://www.astm.org/Standards/D1238.htm, (4 pgs) (Date Unknown).

RockTron Technology Overview Presentation Slides, IGEM 2010, (78 pgs) (Date Unknown).

Barnes et al., "Ash Utilisation from Coal-Based Power Plants" (30 pgs) (Date Unknown).

Dr. Matthias Berghahn, "Science-to-Business Center Eco$^2$, Smart fly ash solutions" (20 pgs), May 2010.

* cited by examiner

| NO | CLASS | NORMALIZE | CUMUL | NO | CLASS | NORMALIZE | CUMUL | NO | CLASS | NORMALIZE | CUMUL |
|---|---|---|---|---|---|---|---|---|---|---|---|
| 1 | 0.04 | 0 | 0 | 51 | 7.4949 | 0.03028682 | 16.9732438 | 101 | 82.444 | 0.36051876 | 63.5274891 |
| 2 | 0.7148 | 0.00041314 | 0.1781044 | 52 | 7.8631 | 0.03190914 | 17.8785108 | 102 | 86.494 | 0.37836339 | 65.5645082 |
| 3 | 0.7499 | 0.00056779 | 0.24813927 | 53 | 8.2494 | 0.03361121 | 18.80887412 | 103 | 90.744 | 0.39708925 | 67.6984768 |
| 4 | 0.7867 | 0.00072994 | 0.32193116 | 54 | 8.6547 | 0.035397 | 19.76133999 | 104 | 95.202 | 0.41673156 | 69.9166926 |
| 5 | 0.8254 | 0.00090045 | 0.39993374 | 55 | 9.0799 | 0.03727046 | 20.73334185 | 105 | 99.878 | 0.43733441 | 72.2032498 |
| 6 | 0.8659 | 0.0010789 | 0.4820016 | 56 | 9.5259 | 0.03923557 | 21.72122216 | 106 | 104.78 | 0.45893302 | 74.5370065 |
| 7 | 0.9085 | 0.0012666 | 0.56880421 | 57 | 9.9939 | 0.04129762 | 22.721404 | 107 | 109.93 | 0.48162435 | 76.8991623 |
| 8 | 0.9531 | 0.00146311 | 0.66020498 | 58 | 10.484 | 0.04345704 | 23.72728548 | 108 | 115.33 | 0.5054172 | 79.2578014 |
| 9 | 1 | 0.00166975 | 0.75689185 | 59 | 11 | 0.04573058 | 24.74715449 | 109 | 121 | 0.53039969 | 81.5862523 |
| 10 | 1.0491 | 0.00188609 | 0.85873796 | 60 | 11.54 | 0.04810987 | 25.75517635 | 110 | 126.94 | 0.55657182 | 83.8480968 |
| 11 | 1.1006 | 0.00211301 | 0.96624191 | 61 | 12.107 | 0.05060811 | 26.75572366 | 111 | 133.18 | 0.58406578 | 86.018598 |
| 12 | 1.1547 | 0.00235137 | 1.07991558 | 62 | 12.702 | 0.05322973 | 27.75266688 | 112 | 139.72 | 0.61288156 | 88.0638398 |
| 13 | 1.2114 | 0.0026012 | 1.19986033 | 63 | 13.326 | 0.05597913 | 28.732916 | 113 | 146.58 | 0.64310728 | 89.960963 |
| 14 | 1.2709 | 0.00286336 | 1.32660774 | 64 | 13.98 | 0.05886071 | 29.693138 | 114 | 153.78 | 0.67483108 | 91.6920604 |
| 15 | 1.3334 | 0.00313874 | 1.4607042 | 65 | 14.667 | 0.06188769 | 30.6315746 | 115 | 161.34 | 0.70814107 | 93.2458018 |
| 16 | 1.3989 | 0.00342734 | 1.60227761 | 66 | 15.388 | 0.06506447 | 31.5438151 | 116 | 169.27 | 0.7430813 | 94.6170908 |
| 17 | 1.4676 | 0.00373004 | 1.75189571 | 67 | 16.144 | 0.06839547 | 32.4261725 | 117 | 177.58 | 0.77969585 | 95.810441 |

FIG. 5A-1

|     | 145 | 180 | 184 |     | 145 | 180 | 184 |     | 145 | 180 | 184 |
|-----|--------|------------|------------|-----|--------|------------|------------|-----|--------|------------|------------|
| 18  | 1.5397 | 0.00404772 | 1.91014203 | 68  | 16.937 | 0.07188949 | 33.27681   | 118 | 186.3  | 0.81811689 | 96.8417959 |
| 19  | 1.6153 | 0.00438082 | 2.07739411 | 69  | 17.769 | 0.07555536 | 34.0944284 | 119 | 195.46 | 0.85847661 | 97.7339396 |
| 20  | 1.6947 | 0.00473066 | 2.25448638 | 70  | 18.642 | 0.07940187 | 34.8783516 | 120 | 205.06 | 0.90077501 | 98.5138027 |
| 21  | 1.778  | 0.00509769 | 2.44182521 | 71  | 19.558 | 0.08343784 | 35.6285872 | 121 | 215.13 | 0.94514426 | 99.2170902 |
| 22  | 1.8653 | 0.00548234 | 2.63982544 | 72  | 20.518 | 0.08766768 | 36.3451475 | 122 | 225.7  | 0.99171655 | 99.8836335 |
| 23  | 1.9569 | 0.00588593 | 2.84936895 | 73  | 21.526 | 0.09210901 | 37.0309695 | 123 | 236.79 | 1.04058001 | 100        |
| 24  | 2.0531 | 0.0063098  | 3.07136023 | 74  | 22.584 | 0.09677064 | 37.6880202 | 124 | 248.42 | 1.09182276 | 100        |
| 25  | 2.1539 | 0.00675393 | 3.30602426 | 75  | 23.693 | 0.10165699 | 38.3184274 | 125 | 260.63 | 1.14562103 | 100        |
| 26  | 2.2598 | 0.00722054 | 3.5547614  | 76  | 24.858 | 0.1067908  | 38.9271431 | 126 | 273.43 | 1.20201889 | 100        |
| 27  | 2.3708 | 0.00770961 | 3.81781741 | 77  | 26.079 | 0.1121699  | 39.5168886 | 127 | 286.87 | 1.26123664 | 100        |
| 28  | 2.4873 | 0.00822292 | 4.09638989 | 78  | 27.36  | 0.1178141  | 40.0929299 | 128 | 300.96 | 1.32331834 | 100        |
| 29  | 2.6094 | 0.0087609  | 4.39097155 | 79  | 28.704 | 0.12373587 | 40.6603231 | 129 | 315.74 | 1.38844025 | 100        |
| 30  | 2.7376 | 0.00932576 | 4.70302561 | 80  | 30.114 | 0.12994845 | 41.2244198 | 130 | 331.26 | 1.45682265 | 100        |
| 31  | 2.8721 | 0.00991838 | 5.0332978  | 81  | 31.594 | 0.13646945 | 41.7911994 | 131 | 347.53 | 1.52850962 | 100        |
| 32  | 3.0132 | 0.01054008 | 5.38277348 | 82  | 33.146 | 0.14330769 | 42.3660732 | 132 | 364.6  | 1.60372145 | 100        |
| 33  | 3.1613 | 0.01119262 | 5.75268134 | 83  | 34.774 | 0.15048079 | 42.9553788 | 133 | 382.51 | 1.6826344  | 100        |
| 34  | 3.3166 | 0.01187688 | 6.14373688 | 84  | 36.482 | 0.15800638 | 43.5655521 | 134 | 401.31 | 1.76546875 | 100        |

FIG. 5A-2

| | 145 | 180 | 184 | | 145 | 180 | 184 | | 145 | 180 | 184 |
|---|---|---|---|---|---|---|---|---|---|---|---|
| 35 | 3.4795 | 0.01259464 | 6.55713154 | 85 | 38.275 | 0.16590649 | 44.2034713 | 135 | 421.02 | 1.85231264 | 100 |
| 36 | 3.6504 | 0.01334764 | 6.99402758 | 86 | 40.155 | 0.17418992 | 44.8750158 | 136 | 441.71 | 1.9434745 | 100 |
| 37 | 3.8298 | 0.01413809 | 7.45580225 | 87 | 42.128 | 0.18288313 | 45.5875357 | 137 | 463.4 | 2.03904243 | 100 |
| 38 | 4.0179 | 0.01496687 | 7.94300029 | 88 | 44.197 | 0.19199931 | 46.3473216 | 138 | 486.17 | 2.13936894 | 100 |
| 39 | 4.2153 | 0.01583663 | 8.45712129 | 89 | 46.369 | 0.20156932 | 47.1621275 | 139 | 510.05 | 2.24458619 | 100 |
| 40 | 4.4224 | 0.01674913 | 8.99905225 | 90 | 48.647 | 0.21160638 | 48.0381878 | 140 | 535.11 | 2.35500263 | 100 |
| 41 | 4.6397 | 0.01770657 | 9.56982083 | 91 | 51.036 | 0.22213251 | 48.9823679 | 141 | 561.4 | 2.47083854 | 100 |
| 42 | 4.8676 | 0.01871072 | 10.1700459 | 92 | 53.544 | 0.23318297 | 50.002599 | 142 | 588.98 | 2.59235831 | 100 |
| 43 | 5.1067 | 0.01976421 | 10.8006979 | 93 | 56.174 | 0.24477096 | 51.1045623 | 143 | 617.92 | 2.71987034 | 100 |
| 44 | 5.3576 | 0.02086979 | 11.4625423 | 94 | 58.934 | 0.25693175 | 52.2956252 | 144 | 648.27 | 2.85359496 | 100 |
| 45 | 5.6208 | 0.02202938 | 12.1558389 | 95 | 61.829 | 0.26968736 | 53.581379 | 145 | 680.12 | 2.99392869 | 100 |
| 46 | 5.8969 | 0.02324599 | 12.8808335 | 96 | 64.866 | 0.28306864 | 54.967549 | 146 | 713.53 | 3.14113592 | 100 |
| 47 | 6.1866 | 0.02452234 | 13.6377162 | 97 | 68.053 | 0.29711082 | 56.4593755 | 147 | 748.58 | 3.29556912 | 100 |
| 48 | 6.4906 | 0.02586179 | 14.426316 | 98 | 71.396 | 0.31184036 | 58.0598907 | 148 | 785.36 | 3.45762484 | 100 |
| 49 | 6.8094 | 0.02726645 | 15.2455498 | 99 | 74.904 | 0.3272969 | 59.7719024 | 149 | 823.94 | 3.62761152 | 100 |
| 50 | 7.144 | 0.02874073 | 16.0951854 | 100 | 78.584 | 0.34351128 | 61.5951931 | | | | |

FIG. 5A-3

| NO | CLASS /145 | SUM /186 | DIFF /188 | NO | CLASS /145 | SUM /186 | DIFF /188 | NO | CLASS /145 | SUM /186 | DIFF /188 |
|---|---|---|---|---|---|---|---|---|---|---|---|
| 1 | 0.04 | 0 | 0 | 51 | 7.4949 | 17.92 | 0.896432518 | 101 | 82.444 | 62.6123 | 0.837502167 |
| 2 | 0.7148 | 0.22716 | 0.00240601 | 52 | 7.8631 | 18.8287 | 0.902796781 | 102 | 86.494 | 64.5485 | 1.032374049 |
| 3 | 0.7499 | 0.25744 | 8.65576E-05 | 53 | 8.2494 | 19.7878 | 0.958493563 | 103 | 90.744 | 66.5341 | 1.355811639 |
| 4 | 0.7867 | 0.28268 | 0.001540465 | 54 | 8.6547 | 20.7469 | 0.971114935 | 104 | 95.202 | 68.5188 | 1.954217876 |
| 5 | 0.8254 | 0.31297 | 0.007562727 | 55 | 9.0799 | 21.7564 | 1.046591487 | 105 | 99.878 | 70.5034 | 2.889371121 |
| 6 | 0.8659 | 0.34326 | 0.019250007 | 56 | 9.5259 | 22.766 | 1.091622481 | 106 | 104.78 | 72.3386 | 4.833038753 |
| 7 | 0.9085 | 0.3685 | 0.040123098 | 57 | 9.9939 | 23.8261 | 1.220326782 | 107 | 109.93 | 74.2737 | 6.892823082 |
| 8 | 0.9531 | 0.39878 | 0.068340877 | 58 | 10.484 | 24.9366 | 1.461127887 | 108 | 115.33 | 76.0594 | 10.22991888 |
| 9 | 1 | 0.42907 | 0.107466185 | 59 | 11 | 25.9967 | 1.575376671 | 109 | 121 | 77.7945 | 14.37714781 |
| 10 | 1.0491 | 0.45936 | 0.159503631 | 60 | 11.54 | 27.1072 | 1.837270343 | 110 | 126.94 | 79.4811 | 19.07046537 |
| 11 | 1.1006 | 0.49469 | 0.222357242 | 61 | 12.107 | 28.2178 | 2.133131391 | 111 | 133.18 | 81.1668 | 23.5403443 |
| 12 | 1.1547 | 0.53003 | 0.302374704 | 62 | 12.702 | 29.2778 | 2.326608608 | 112 | 139.72 | 82.6533 | 29.27343778 |
| 13 | 1.2114 | 0.57041 | 0.396204317 | 63 | 13.326 | 30.2874 | 2.416420358 | 113 | 146.58 | 84.2399 | 32.73013312 |
| 14 | 1.2709 | 0.61584 | 0.505185388 | 64 | 13.98 | 31.2465 | 2.412936519 | 114 | 153.78 | 85.677 | 36.18086387 |
| 15 | 1.3334 | 0.67137 | 0.623047377 | 65 | 14.667 | 32.1046 | 2.16993355 | 115 | 161.34 | 87.1646 | 36.98154959 |
| 16 | 1.3989 | 0.73195 | 0.757477981 | 66 | 15.388 | 32.8618 | 1.737160751 | 116 | 169.27 | 88.5026 | 37.3871969 |
| 17 | 1.4676 | 0.80766 | 0.891573526 | 67 | 16.144 | 33.5181 | 1.1920953 | 117 | 177.58 | 89.9406 | 34.45489973 |

FIG. 5B-1

| 145 | 186 | 188 | | 145 | 186 | 188 | | 145 | 186 | 188 |
|---|---|---|---|---|---|---|---|---|---|---|
| 18 | 1.5397 | 0.89348 | 68 | 16.937 | 34.0733 | 0.634436179 | 118 | 186.3 | 91.1301 | 32.62374743 |
| 19 | 1.6153 | 0.99444 | 1.033605147 | 69 | 17.769 | 34.5276 | 0.187668839 | 119 | 195.46 | 92.4195 | 28.24284161 |
| 20 | 1.6947 | 1.11559 | 1.172797611 | 70 | 8.642 | 34.9819 | 0.010731997 | 120 | 205.06 | 93.51 | 25.03841998 |
| 21 | 1.778 | 1.25693 | 1.297094293 | 71 | 19.558 | 35.3858 | 0.058955837 | 121 | 215.13 | 94.5509 | 21.77367472 |
| 22 | 1.8653 | 1.41846 | 1.403983526 | 72 | 20.518 | 35.7391 | 0.367254787 | 122 | 225.7 | 95.4432 | 19.71744143 |
| 23 | 1.9569 | 1.60523 | 1.491733772 | 73 | 21.526 | 36.1934 | 0.701450676 | 123 | 236.79 | 96.2355 | 14.17117038 |
| 24 | 2.0531 | 1.82229 | 1.547876243 | 74 | 22.584 | 36.6982 | 0.979678699 | 124 | 248.42 | 96.8651 | 9.827428726 |
| 25 | 2.1539 | 2.06964 | 1.560171682 | 75 | 23.693 | 37.2535 | 1.13406614 | 125 | 260.63 | 97.4695 | 6.403551715 |
| 26 | 2.2598 | 2.34727 | 1.528648519 | 76 | 24.858 | 37.8593 | 1.140395667 | 126 | 273.43 | 97.8692 | 4.540400989 |
| 27 | 2.3708 | 2.6552 | 1.458027018 | 77 | 26.079 | 38.6164 | 0.810816766 | 127 | 286.87 | 98.2669 | 3.00376906 |
| 28 | 2.4873 | 2.99845 | 1.351689935 | 78 | 27.36 | 39.3736 | 0.517406765 | 128 | 300.96 | 98.564 | 2.062130177 |
| 29 | 2.6094 | 3.37705 | 1.205466299 | 79 | 28.704 | 40.1308 | 0.280389373 | 129 | 315.74 | 98.8116 | 1.412309772 |
| 30 | 2.7376 | 3.79097 | 1.028046837 | 80 | 30.114 | 40.9386 | 0.08170556 | 130 | 331.26 | 99.0592 | 0.851106333 |
| 31 | 2.8721 | 4.23519 | 0.83184014 | 81 | 31.594 | 41.5985 | 0.037129535 | 131 | 347.53 | 99.2573 | 0.551627799 |
| 32 | 3.0132 | 4.71979 | 0.636979092 | 82 | 33.146 | 42.2638 | 0.010460127 | 132 | 364.6 | 99.4554 | 0.296624124 |
| 33 | 3.1613 | 5.24982 | 0.439551731 | 83 | 34.774 | 42.7845 | 0.029210569 | 133 | 382.51 | 99.6535 | 0.120095308 |
| 34 | 3.3166 | 5.75461 | 0.252873552 | 84 | 36.482 | 43.3329 | 0.054141486 | 134 | 401.31 | 99.802 | 0.039197823 |
| 35 | 3.4795 | 6.36035 | 0.151422839 | 85 | 38.275 | 43.8527 | 0.123056057 | 135 | 421.02 | 99.9011 | 0.009789559 |
| | | | 0.038721401 | | | | | | | | |

FIG. 5B-2

| | 145 | 186 | 188 | | 145 | 186 | 188 | | 145 | 186 | 188 |
|---|---|---|---|---|---|---|---|---|---|---|---|
| 36 | 3.6504 | 6.91562 | 0.006147278 | 86 | 40.155 | 44.4824 | 0.154154166 | 136 | 441.71 | 99.9506 | 0.002442445 |
| 37 | 3.8298 | 7.52137 | 0.004299261 | 87 | 42.128 | 45.1736 | 0.171336112 | 137 | 463.4 | 99.9852 | 0.000217749 |
| 38 | 4.0179 | 8.1776 | 0.055036084 | 88 | 44.197 | 45.9342 | 0.170707021 | 138 | 486.17 | 99.9951 | 2.3543E-05 |
| 39 | 4.2153 | 8.83383 | 0.141905688 | 89 | 46.369 | 46.8334 | 0.108087966 | 139 | 510.05 | 99.9996 | 1.56192E-07 |
| 40 | 4.4224 | 9.49005 | 0.241080753 | 90 | 48.647 | 47.8128 | 0.050818863 | 140 | 535.11 | 100 | 0 |
| 41 | 4.6397 | 10.1463 | 0.332304027 | 91 | 51.036 | 48.8219 | 0.025760406 | 141 | 561.4 | 100 | 0 |
| 42 | 4.8676 | 10.853 | 0.466405876 | 92 | 53.544 | 49.8765 | 0.015899899 | 142 | 588.98 | 100 | 0 |
| 43 | 5.1067 | 11.5597 | 0.576070495 | 93 | 56.174 | 51.0222 | 0.006784405 | 143 | 617.92 | 100 | 0 |
| 44 | 5.3576 | 12.2664 | 0.646182374 | 94 | 58.934 | 52.1174 | 0.031761958 | 144 | 648.27 | 100 | 0 |
| 45 | 5.6208 | 13.0236 | 0.752978023 | 95 | 61.829 | 53.3136 | 0.071718464 | 145 | 680.12 | 100 | 0 |
| 46 | 5.8969 | 13.7303 | 0.721572955 | 96 | 64.866 | 54.5088 | 0.210461926 | 146 | 713.53 | 100 | 0 |
| 47 | 6.1866 | 14.538 | 0.810424509 | 97 | 68.053 | 55.903 | 0.309507323 | 147 | 748.58 | 100 | 0 |
| 48 | 6.4906 | 15.3456 | 0.845112455 | 98 | 71.396 | 57.3954 | 0.441574461 | 148 | 785.36 | 100 | 0 |
| 49 | 6.8094 | 16.1533 | 0.823974177 | 99 | 74.904 | 59.0363 | 0.541137904 | 149 | 823.94 | 100 | 0 |
| 50 | 7.144 | 17.0114 | 0.839491306 | 100 | 78.584 | 60.7753 | 0.672277997 | | | | |

FIG. 5B-3

| Name | Sample 1 | Sample 2 | Sample 3 | Sample 4 | Sample 5 | Sample 6 | Sample 7 |
|---|---|---|---|---|---|---|---|
| Wt % | 0.55062 | 0 | 0 | 0 | 0 | 0 | 0.44938363 |
| Optim Vol % | 0.56479 | 0 | 0 | 0 | 0 | 0 | 0.4952 |
| M. Chroma | 2 | 2 | 4 | 4 | 4 | 4 | 1 |
| Spec. Grav | 2.39 | 2.27 | 2.27 | 2.27 | 2.27 | 2.27 | 1.98 |

FIG. 6

| Class Particle Evaluation | Sample 1 Volume % < | Sample 2 Volume % < | Sample 3 Volume % < | Sample 4 Volume % < | Sample 5 Volume % < | Sample 6 Volume % < | Sample 7 Volume % < |
|---|---|---|---|---|---|---|---|
| 0.04 | 0 | 0 | 0 | 0 | 3.38 | 0 | 0 |
| 0.7148 | 0.45 | 0 | 24.6 | 0 | 3.52 | 0 | 0 |
| 0.7499 | 0.51 | 0 | 25 | 0 | 3.64 | 0 | 0 |
| 0.7867 | 0.56 | 0 | 25.4 | 0 | 3.74 | 0 | 0 |
| 0.8254 | 0.62 | 0 | 25.8 | 0 | 3.84 | 0 | 0 |
| 0.8659 | 0.68 | 0 | 26.1 | 0 | 3.91 | 0 | 0 |
| 0.9085 | 0.73 | 0 | 26.4 | 0 | 3.99 | 0 | 0 |
| 0.9531 | 0.79 | 0 | 26.7 | 0 | 4.07 | 0 | 0 |
| 1 | 0.85 | 0 | 27 | 0 | 4.16 | 0 | 0 |
| 1.0491 | 0.91 | 0 | 27.2 | 0 | 4.28 | 0 | 0 |
| 1.1006 | 0.98 | 0 | 27.4 | 0 | 4.44 | 0 | 0 |
| 1.1547 | 1.05 | 0 | 27.7 | 0 | 4.64 | 0 | 0 |
| 1.2114 | 1.13 | 0 | 27.9 | 0 | 4.89 | 0 | 0 |
| 1.2709 | 1.22 | 0 | 28.1 | 0 | 5.26 | 0 | 0 |
| 1.3334 | 1.33 | 0 | 28.3 | 0 | 5.69 | 0 | 0 |
| 1.3989 | 1.45 | 0 | 28.6 | 0 | 6.25 | 0 | 0 |
| 1.4676 | 1.6 | 0 | 28.8 | 0 | 6.97 | 0 | 0 |
| 1.5397 | 1.77 | 0 | 29.1 | 0 | 7.71 | 0.00013 | 0 |
| 1.6153 | 1.97 | 0 | 29.4 | 0 | 8.72 | 0.0008 | 0 |
| 1.6947 | 2.21 | 0 | 29.8 | 0 | 9.8 | 0.0052 | 0 |
| 1.778 | 2.49 | 0 | 30.2 | 0 | 10.9 | 0.013 | 0 |
| 1.8653 | 2.81 | 0 | 30.6 | 0.00023 | 12.3 | 0.053 | 0 |
| 1.9569 | 3.18 | 0 | 31.2 | 0.00056 | 13.7 | 0.11 | 0 |
| 2.0531 | 3.61 | 0 | 31.8 | 0.0063 | 15.4 | 0.27 | 0 |
| 2.1539 | 4.1 | 0 | 32.5 | 0.018 | 17 | 0.48 | 0 |
| 2.2598 | 4.65 | 0 | 33.3 | 0.06 | 18.7 | 0.87 | 0 |
| 2.3708 | 5.26 | 0 | 34.1 | 0.14 | 20.5 | 1.37 | 0 |
| 2.4873 | 5.94 | 0 | 35.1 | 0.3 | 22.4 | 2.07 | 0 |
| 2.6094 | 6.69 | 0 | 36.1 | 0.58 | 24.1 | 2.91 | 0 |
| 2.7376 | 7.51 | 0 | 37.2 | 0.95 | 26.1 | 3.91 | 0 |
| 2.8721 | 8.39 | 0 | 38.4 | 1.53 | 27.9 | 5.14 | 0 |
| 3.0132 | 9.35 | 0.00039 | 39.7 | 2.18 | 29.7 | 6.47 | 0 |
| 3.1613 | 10.4 | 0.001 | 41 | 3.09 | 31.6 | 8.09 | 0 |
| 3.3166 | 11.4 | 0.0073 | 42.4 | 4.14 | 33.5 | 9.89 | 0 |
| 3.4795 | 12.6 | 0.016 | 43.8 | 5.37 | 35.4 | 11.9 | 0 |
| 3.6504 | 13.7 | 0.057 | 45.2 | 6.76 | 37.2 | 14.1 | 0 |
| 3.8298 | 14.9 | 0.11 | 46.6 | 8.38 | 39.2 | 16.5 | 0 |
| 4.0179 | 16.2 | 0.24 | 48 | 10.2 | 41.1 | 19.1 | 0 |
| 4.2153 | 17.5 | 0.4 | 49.4 | 12.2 | 43.1 | 21.9 | 0 |
| 4.4224 | 18.8 | 0.7 | 50.7 | 14.4 | 45.1 | 24.8 | 0 |
| 4.6397 | 20.1 | 1.03 | 52 | 16.8 | 47.2 | 28 | 0 |
| 4.8676 | 21.5 | 1.52 | 53.3 | 19.3 | 49.2 | 31.2 | 0 |

*FIG. 7A*

| | ⌐145 | ⌐146 | ⌐147 | ⌐148 | ⌐149 | ⌐150 | ⌐151 | ⌐152 |
|---|---|---|---|---|---|---|---|---|
| Class Particle Evaluation | Sample 1 Volume % < | Sample 2 Volume % < | Sample 3 Volume % < | Sample 4 Volume % < | Sample 5 Volume % < | Sample 6 Volume % < | Sample 7 Volume % < | |
| 5.1067 | 22.9 | 2.05 | 55.6 | 24.7 | 53.4 | 38.1 | 0 | |
| 5.3576 | 24.3 | 2.78 | 56.8 | 27.6 | 55.5 | 41.6 | 0 | |
| 5.6208 | 25.8 | 3.54 | 57.8 | 30.8 | 57.8 | 45.5 | 0 | |
| 5.8969 | 27.2 | 4.52 | 59 | 33.3 | 59.5 | 48.4 | 0 | |
| 6.1866 | 28.8 | 5.56 | 60 | 36.6 | 61.8 | 52.4 | 0 | |
| 6.4906 | 30.4 | 6.82 | 61.1 | 39.3 | 63.6 | 55.4 | 0 | |
| 6.8094 | 32 | 8.16 | 62.2 | 42.1 | 65.3 | 58.6 | 0 | |
| 7.144 | 33.7 | 9.72 | 63.4 | 44.7 | 66.8 | 61.4 | 0 | |
| 7.4949 | 35.5 | 11.4 | 64.5 | 47.1 | 68.1 | 64.1 | 0 | |
| 7.8631 | 37.3 | 13.3 | 65.7 | 49.4 | 69.1 | 66.5 | 0 | |
| 8.2494 | 39.2 | 15.2 | 66.9 | 51.2 | 69.7 | 68.3 | 0 | |
| 8.6547 | 41.1 | 17.4 | 68.2 | 53 | 70.3 | 70.2 | 0 | |
| 9.0799 | 43.1 | 19.7 | 69.5 | 54.5 | 70.7 | 71.7 | 0 | |
| 9.5259 | 45.1 | 22.1 | 70.9 | 56 | 71.1 | 73.2 | 0 | |
| 9.9939 | 47.2 | 24.7 | 72.3 | 57.6 | 71.7 | 74.6 | 0 | |
| 10.484 | 49.4 | 27.3 | 73.8 | 59 | 72.5 | 76.1 | 0 | |
| 11 | 51.5 | 30.1 | 75.4 | 60.5 | 73.4 | 77.5 | 0 | |
| 11.54 | 53.7 | 33 | 76.9 | 62.1 | 74.8 | 79.1 | 0 | |
| 12.107 | 55.9 | 35.9 | 78.4 | 63.9 | 76.5 | 81 | 0 | |
| 12.702 | 58 | 38.8 | 79.9 | 65.9 | 78.6 | 83.1 | 0 | |
| 13.326 | 60 | 41.7 | 81.2 | 67.9 | 80.8 | 85.1 | 0 | |
| 13.98 | 61.9 | 44.6 | 82.3 | 70 | 83.2 | 87.2 | 0 | |
| 14.667 | 63.6 | 47.3 | 83.2 | 72.2 | 85.5 | 89.3 | 0 | |
| 15.388 | 65.1 | 50 | 83.9 | 74.4 | 87.9 | 91.3 | 0 | |
| 16.144 | 66.4 | 52.6 | 84.5 | 76.4 | 89.8 | 93 | 0 | |
| 16.937 | 67.5 | 55 | 84.9 | 78.6 | 91.8 | 94.6 | 0 | |
| 17.769 | 68.4 | 57.2 | 85.2 | 80.4 | 93.3 | 95.8 | 0 | |
| 18.642 | 69.3 | 59.4 | 85.6 | 82.3 | 94.6 | 96.8 | 0 | |
| 19.558 | 70.1 | 61.4 | 85.9 | 83.9 | 95.6 | 97.5 | 0 | |
| 20.518 | 70.8 | 63.5 | 86.5 | 85.5 | 96.5 | 98.1 | 0 | |
| 21.526 | 71.7 | 65.4 | 87 | 87 | 97.1 | 98.5 | 0 | |
| 22.584 | 72.7 | 67.3 | 87.9 | 88.3 | 97.5 | 98.8 | 0 | |
| 23.693 | 73.8 | 69.2 | 88.8 | 89.5 | 97.9 | 99 | 0 | |
| 24.858 | 75 | 71.1 | 89.9 | 90.4 | 98 | 99.1 | 0 | |
| 26.079 | 76.5 | 73 | 91.1 | 91.2 | 98.1 | 99.1 | 0 | |
| 27.36 | 78 | 74.9 | 92.2 | 91.8 | 98.1 | 99.2 | 0 | |
| 28.704 | 79.5 | 76.8 | 93.3 | 92.4 | 98.2 | 99.2 | 0 | |
| 30.114 | 81.1 | 78.6 | 94.1 | 92.8 | 98.2 | 99.2 | 0.00022 | |
| 31.594 | 82.4 | 80.3 | 94.9 | 93.2 | 98.3 | 99.2 | 0.0077 | |
| 33.146 | 83.7 | 82.1 | 95.2 | 93.5 | 98.4 | 99.2 | 0.026 | |
| 34.774 | 84.6 | 83.6 | 95.5 | 93.8 | 98.7 | 99.2 | 0.16 | |
| 36.482 | 85.5 | 85.1 | 95.6 | 94.2 | 99 | 99.2 | 0.35 | |

*FIG. 7B*

| Class Particle Evaluation | Sample 1 Volume % < | Sample 2 Volume % < | Sample 3 Volume % < | Sample 4 Volume % < | Sample 5 Volume % < | Sample 6 Volume % < | Sample 7 |
|---|---|---|---|---|---|---|---|
| 38.275 | 86 | 86.4 | 95.7 | 94.7 | 99.3 | 99.3 | 0.89 |
| 40.155 | 86.6 | 87.7 | 95.7 | 95.2 | 99.6 | 99.4 | 1.55 |
| 42.128 | 86.9 | 88.9 | 95.7 | 95.8 | 99.8 | 99.5 | 2.64 |
| 44.197 | 87.2 | 90 | 95.8 | 96.5 | 99.9 | 99.6 | 3.87 |
| 46.369 | 87.5 | 90.9 | 95.8 | 97.2 | 99.98 | 99.7 | 5.38 |
| 48.647 | 87.9 | 91.8 | 96 | 97.8 | 99.99 | 99.8 | 6.95 |
| 51.036 | 88.3 | 92.5 | 96.1 | 98.4 | 100 | 99.8 | 8.58 |
| 53.544 | 88.8 | 93.2 | 96.4 | 98.8 | 100 | 99.9 | 10.2 |
| 56.174 | 89.5 | 93.6 | 96.7 | 99.1 | 100 | 99.9 | 11.8 |
| 58.934 | 90.1 | 94 | 97 | 99.4 | 100 | 99.97 | 13.4 |
| 61.829 | 90.9 | 94.2 | 97.3 | 99.6 | 100 | 99.99 | 15 |
| 64.866 | 91.6 | 94.4 | 97.6 | 99.8 | 100 | 99.99 | 16.7 |
| 68.053 | 92.4 | 94.4 | 97.9 | 99.9 | 100 | 99.998 | 18.7 |
| 71.396 | 93.1 | 94.5 | 98.1 | 99.9 | 100 | 100 | 21 |
| 74.904 | 93.8 | 94.5 | 98.3 | 99.97 | 100 | 100 | 23.6 |
| 78.584 | 94.4 | 94.6 | 98.5 | 99.99 | 100 | 100 | 26.5 |
| 82.444 | 94.9 | 94.7 | 98.7 | 99.997 | 100 | 100 | 29.7 |
| 86.494 | 95.4 | 94.9 | 98.9 | 100 | 100 | 100 | 33.1 |
| 90.744 | 95.9 | 95.2 | 99.1 | 100 | 100 | 100 | 36.6 |
| 95.202 | 96.3 | 95.6 | 99.2 | 100 | 100 | 100 | 40.2 |
| 99.878 | 96.7 | 96.1 | 99.4 | 100 | 100 | 100 | 43.8 |
| 104.78 | 97 | 96.6 | 99.6 | 100 | 100 | 100 | 47.2 |
| 109.93 | 97.4 | 97.3 | 99.7 | 100 | 100 | 100 | 50.7 |
| 115.33 | 97.7 | 97.8 | 99.8 | 100 | 100 | 100 | 54 |
| 121 | 97.9 | 98.4 | 99.9 | 100 | 100 | 100 | 57.3 |
| 126.94 | 98.2 | 98.8 | 99.9 | 100 | 100 | 100 | 60.4 |
| 133.18 | 98.4 | 99.2 | 99.9 | 100 | 100 | 100 | 63.6 |
| 139.72 | 98.5 | 99.5 | 99.98 | 100 | 100 | 100 | 66.5 |
| 146.58 | 98.7 | 99.7 | 99.99 | 100 | 100 | 100 | 69.5 |
| 153.78 | 98.8 | 99.8 | 99.99 | 100 | 100 | 100 | 72.3 |
| 161.34 | 99 | 99.8 | 99.997 | 100 | 100 | 100 | 75.1 |
| 169.27 | 99.1 | 99.9 | 99.999 | 100 | 100 | 100 | 77.7 |
| 177.58 | 99.3 | 99.9 | 100 | 100 | 100 | 100 | 80.4 |
| 186.3 | 99.4 | 99.9 | 100 | 100 | 100 | 100 | 82.7 |
| 195.46 | 99.6 | 99.9 | 100 | 100 | 100 | 100 | 85.1 |
| 205.06 | 99.7 | 99.9 | 100 | 100 | 100 | 100 | 87.2 |
| 215.13 | 99.8 | 99.9 | 100 | 100 | 100 | 100 | 89.2 |
| 225.7 | 99.9 | 99.97 | 100 | 100 | 100 | 100 | 90.9 |
| 236.79 | 99.9 | 99.98 | 100 | 100 | 100 | 100 | 92.5 |
| 248.42 | 99.97 | 99.99 | 100 | 100 | 100 | 100 | 93.7 |
| 260.63 | 99.99 | 99.997 | 100 | 100 | 100 | 100 | 94.9 |
| 273.43 | 99.997 | 99.999 | 100 | 100 | 100 | 100 | 95.7 |

FIG. 7C

| Class Particle Evaluation | Sample 1 Volume % < | Sample 2 Volume % < | Sample 3 Volume % < | Sample 4 Volume % < | Sample 5 Volume % < | Sample 6 Volume % < | Sample 7 |
|---|---|---|---|---|---|---|---|
| 286.87 | 100 | 100 | 100 | 100 | 100 | 100 | 96.5 |
| 300.96 | 100 | 100 | 100 | 100 | 100 | 100 | 97.1 |
| 315.74 | 100 | 100 | 100 | 100 | 100 | 100 | 97.6 |
| 331.26 | 100 | 100 | 100 | 100 | 100 | 100 | 98.1 |
| 347.53 | 100 | 100 | 100 | 100 | 100 | 100 | 98.5 |
| 364.6 | 100 | 100 | 100 | 100 | 100 | 100 | 98.9 |
| 382.51 | 100 | 100 | 100 | 100 | 100 | 100 | 99.3 |
| 401.31 | 100 | 100 | 100 | 100 | 100 | 100 | 99.6 |
| 421.02 | 100 | 100 | 100 | 100 | 100 | 100 | 99.8 |
| 441.71 | 100 | 100 | 100 | 100 | 100 | 100 | 99.9 |
| 463.4 | 100 | 100 | 100 | 100 | 100 | 100 | 99.97 |
| 486.17 | 100 | 100 | 100 | 100 | 100 | 100 | 99.99 |
| 510.05 | 100 | 100 | 100 | 100 | 100 | 100 | 99.999 |
| 535.11 | 100 | 100 | 100 | 100 | 100 | 100 | 100 |
| 561.4 | 100 | 100 | 100 | 100 | 100 | 100 | 100 |
| 588.98 | 100 | 100 | 100 | 100 | 100 | 100 | 100 |
| 617.92 | 100 | 100 | 100 | 100 | 100 | 100 | 100 |
| 648.27 | 100 | 100 | 100 | 100 | 100 | 100 | 100 |
| 680.12 | 100 | 100 | 100 | 100 | 100 | 100 | 100 |
| 713.53 | 100 | 100 | 100 | 100 | 100 | 100 | 100 |
| 748.58 | 100 | 100 | 100 | 100 | 100 | 100 | 100 |
| 785.36 | 100 | 100 | 100 | 100 | 100 | 100 | 100 |
| 823.94 | 100 | 100 | 100 | 100 | 100 | 100 | 100 |

*FIG. 7D*

| Sample | Extruder Barrel Zones Temperature Degrees Fahrenheit ||||  Gate Zone °F | Die Zones °F ||| Screw RPM | Drive Load Amps% | Internal Head PSI | IPM Inches Per Min. | Extrude Density |
| --- | --- | --- | --- | --- | --- | --- | --- | --- | --- | --- | --- | --- | --- |
| | 1 | 2 | 3 | 4 | | 1 | 2 | 3 | | | | | |
| 1 | 330 | 340 | 350 | 350 | 320 | 315 | 315 | 315 | 12 | 40-42 | 2400 | 55 | 0.55 |
| 2 | 280 | 290 | 300 | 350 | 310 | 310 | 310 | 310 | 24.3 | 28.9 | 1800 | 50 | .6187 |

*FIG. 9*

MASTER BATCH METHOD WITH OPTIMIZED FILLER

This application is a continuation-in-part of U.S. patent application Ser. No. 12/565,097 filed 23 Sep. 2009 the disclosure of which is incorporated by this reference as if fully set forth herein.

BACKGROUND OF THE INVENTION

1. The Field of the Invention

This invention relates to a system for forming a composition of matter with an optimized filler. The optimized filler is combined with a base material an anti oxidant and an acid scavenger to form a master batch. The master batch is then mixed with a product resin and processed to form the composition of matter that is formed into a product.

2. The Relevant Technology

A wide variety of manufactured products are made from materials of the type which may permit blending or mixing of one or more fillers before formation of the product. Fillers are typically low cost materials that can range from glass beads to saw dust and are used to reduce the amount of the other material (e.g., plastic) which is typically a more expensive material. Fillers may be selected for reasons including cost reduction and controlling the mechanical properties of the final product. Fillers are typically added as a solid material to a material that can be a liquid or a powder and is typically a liquid at room temperature or is a liquid at an elevated temperature forming a melt. The melt or powder is then processed in some way (e.g., cured, extruded, molded) and then cured or hardened.

Plastics or plastic resins are principally polymers that are synthetically made or, if naturally occurring, are modified in some way. Resin manufacturers convert raw materials like crude oil or natural gas into basic polymers that are used in the manufacture of various goods. Reportedly, thermoplastics are the largest class or category of polymers produced. Polymers are heated to become a liquid and are often modified by incorporating additives which also modify the physical properties of the polymer when cured and/or cooled to reduce the cost of materials and, in turn, the cost of the final product in addition to fillers. M. Xanthos, *Functional Fillers For Plastics* (Wiley-VCH 2005) pp. 1-6.

FIG. 1 shows in simplified form a process for forming a polymer product with a filler. A selected resin 10 along with a chosen filler 12 are blended together 16 with optional additives 14. The resulting mix, melt or blend 16 is then supplied to a forming device/machine 18 to form a product.

Additives that can be combined with resins may include colorants, lubricants, coupling agents and stabilizers. The additives also can include foaming agents to control the density of the resulting material. For example, it is known that low cost fillers like clay, ground limestone, talc and other powdered or granulated materials can be added to or combined with a resin to reduce the cost of the material to produce a given product because less resin is being used. A. Brent Strong, *PLASTICS Materials and Processing*, (3rd Ed. Pearson Prentice Hall 2006), pp. 1-21. Other fillers like calcium carbonate, silicon, glass beads, sawdust, shavings as well as fibrous materials like flax and hemp may also be added to impact on the make up and mechanical properties of the final product.

What is or constitutes an additive or a filler for a polymer is not easily defined. Some additives have certain geometries (e.g., fibers, flakes, spheres, particulates). Particulates usually are spherical or deemed to be spherical; and they have a length to width ratio (i.e., aspect ratio) that is typically regarded as 1. They are not fibers, but instead are typically some form of mixture of different sizes and shapes of a material. The particles are often mixed into the liquid or molten plastic. Mixing a filler into a resin obviously thickens the mixture in much the same way a flour thickens dough. In some cases, fillers may be added to thicken a mixture to control viscosity. If viscosity is too low a thixotrope (e.g., fumed silica) may be added to thicken the molten mixture. If viscosity is too high because a certain amount of filler is needed to control, for example, flammability, a viscosity reducer (e.g., organic acid salts) can be used. A. Brent Strong, *Fundamentals of COMPOSITES MANUFACTURING, Materials, Methods and Applications*, (2nd Ed, Society of Mfg Engineering 2008) pp. 42-43, 70; M. Xanthos, *Functional Fillers For Plastics* (Wiley-VCH 2005) pp. 6-7.

A major motivator to use a filler has been and still is the lowering cost of the ultimate product by reducing the use of expensive resin. That is, less expensive resin is replaced by less expensive filler. But, it is now recognized with increasing clarity that a filler can be used to impact the physical or structural characteristics of the resulting product. For example, glass beads, sawdust, and chips all can be added for different reasons to produce products with different mechanical properties.

Fillers are also known to have some impact on processing characteristics of a melt. For example, unfilled polymers behave like non-newtonian fluids with viscosity changing during melt processing. The addition of fillers will increase the viscosity of the liquid; and that increase in viscosity changes the flow and other processing characteristics of the liquid. However, packing of the filler and particle size distribution of the filler itself is not recognized as a factor influencing the rheology of a melt and have not heretofore been used to regulate or control the viscosity of the melt. Rather, such factors are believed to impact on the material characteristics of the resulting cured or hardened material. M. Xanthos, *Functional Fillers For Plastics* (Wiley-VCH 2005) pp. 32-35.

Widespread use of fillers over time has led to classification of different types of fillers along with fillers that have known benefits or functions. M. Xanthos, *Functional Fillers For Plastics* (Wiley-VCH 2005) pp. 12-15. While the function and use of many different kinds of fillers is known, the process of selecting a filler is largely empirical. Many different kinds have been used in a variety of different ways which is now so well recognized that the information about such fillers has become textbook material. Further, the quality of certain fillers is understood to vary with, among other factors, the source. Thus, many materials that would be suitable or even ideal fillers are not used because the quality is inconsistent not only from one source to another but also with in some batches. Such materials have thus not been used or selected notwithstanding their lower cost and availability.

There are also manufacturing procedures or methods know in which a master batch or blend of material is formed for further blending or mixing with other material. In turn, it is presently believed that related manufacturing costs can be controlled more efficiently.

There is a need for a system to identify or optimize a filler or combination of fillers selected in any composition of matter and more particularly for the selection and optimization of low cost fillers that can be processed or blended to make a uniform filler with consistent physical attributes particularly in resins such as plastics. There is a need for fillers that will impact on the viscosity of the melt and allow for the reduction of production costs. There is a need for developing a master batch system to facilitate use of the optimum filler blend in the ultimate product or products.

BRIEF SUMMARY OF THE INVENTION

To form a composite, an optimized filler material and a resin are combined and blended with an acid scavenger and an anti oxidant to form a master batch. The resin is preferably a medium density polyethelene. The acid scavenger is preferably a hydrotalcite; and the antioxidant is preferably one of a phenolic antioxidant and a phosphite antioxidant and more preferably both. The optimized filler material is made from two or more fillers that are combined to create the optimum filler for the desired application. In some applications the first filler is fly ash and a second filler is fly ash that is different from the first fly ash.

In an alternate method or process, the master batch is combined with another resin and then processed by, for example, extrusion, into a final product.

The optimized filler may be formed by providing a first filler and positioning the first filler in a first holding means. A first metering means is positioned to receive the first filler and operates to meter the first filler. A second filler is positioned in a second holding means. A second metering means receives the second filler and operates to meter the second filler.

An analyzing means is provided for analyzing at least particle size distribution of a material. A sample of the first filler is supplied to the analyzing means which analyzes the sample to determine at least the particle size distribution of the first filler. Similarly, a sample of the second filler is also supplied to the analyzing means which operates to analyze a sample of the second filler to determine at least the particle size distribution of the second filler. The analyzing means is configured and operated to supply a first composition signal reflective of at least the particle size distribution of the first filler and a second composition signal reflective of at least the particle size distribution of the second filler.

Control means are provided and configured to process the first composition signal and the second composition signal which are compared to an ideal particle distribution to determine a first difference between the composition of the first filler particle size distribution and the composition of the ideal filler and to determine the second difference between the composition of the second filler and the composition of said ideal filler. The control means compares the first difference and said second difference and then computes a first metering signal reflective of the first amount of the first filler and a second metering signal reflective of the second amount of the second filler to be blended to result in an optimum filler material having a composition best approximating the composition of the ideal filler. The first metering signal is supplied to the first metering means to operate said first metering means to meter the first filler material for mixing with the second filler material. The second metering signal is sent to the second metering means to operate said second metering means to meter the second filler material. The first filler material and the second filler material after being metered are mixed or blended for further mixing into the master batch.

In other methods, the resin is a medium density polyethelene; the acid scavenger is a hydrotalcite; and the antioxidant is one or both of a phenolic antioxidant and a phosphite antioxidant.

A compounding machine is preferably supplied and operated to blend the optimized filler, resin, acid scavenger and anti oxidant are supplied to said compounding machine to form the master batch. Preferably, the first filler is a first fly ash and the second filler is a second fly ash different from said first fly ash.

The above discussed methods and steps features and steps of the present set out hereinabove will be more fully apparent and from the following description and appended claims as set forth hereinafter.

BRIEF DESCRIPTION OF THE DRAWINGS

The following drawings depict only typical embodiments to illustrate the features and principles of the claimed inventions and therefore are not to be considered limiting of the scope of the appended claims. The invention will be described and explained with additional specificity and detail through the use of the accompanying drawings in which:

FIGS. 5A-1 to 5A-3 shows the particle size distribution of the optimum filler of FIG. 4;

FIG. 5B-1 to 5B-3 shows calculations to determine the optimum mixtures of fillers;

FIG. 6 shows the specific gravity and related characteristics of multiple fly ash fillers that are not the optimum filler;

FIGS. 7A-D is a table showing the cumulative volume percent of sample materials for use as fillers;

FIG. 9 is a table of test results;

DETAILED DESCRIPTION OF THE PREFERRED EMBODIMENTS

Figure 2:
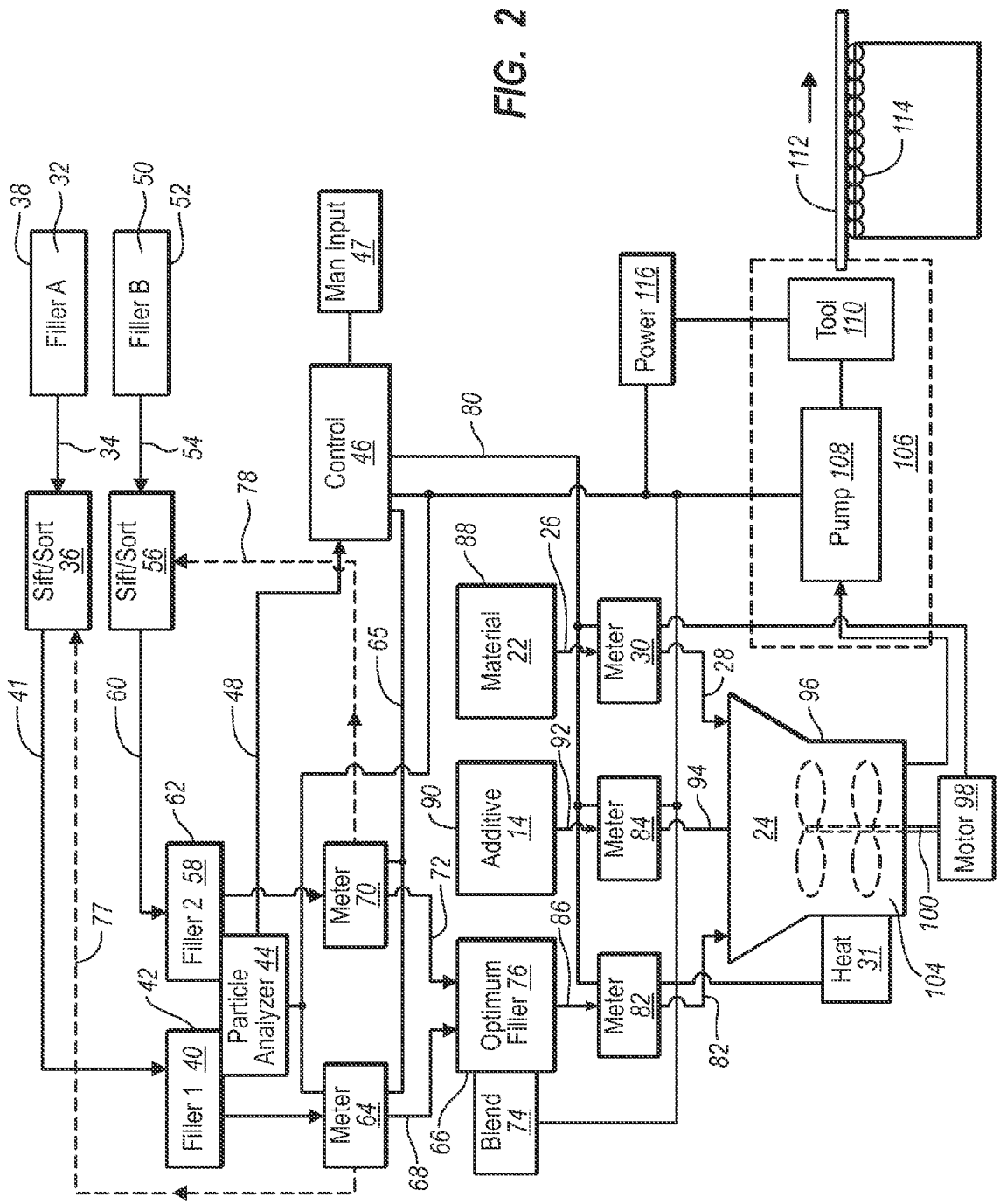
FIG. 2 is a simplified diagram depicting the components of a system for forming a formable composition of the present inventions.
Figure 3:
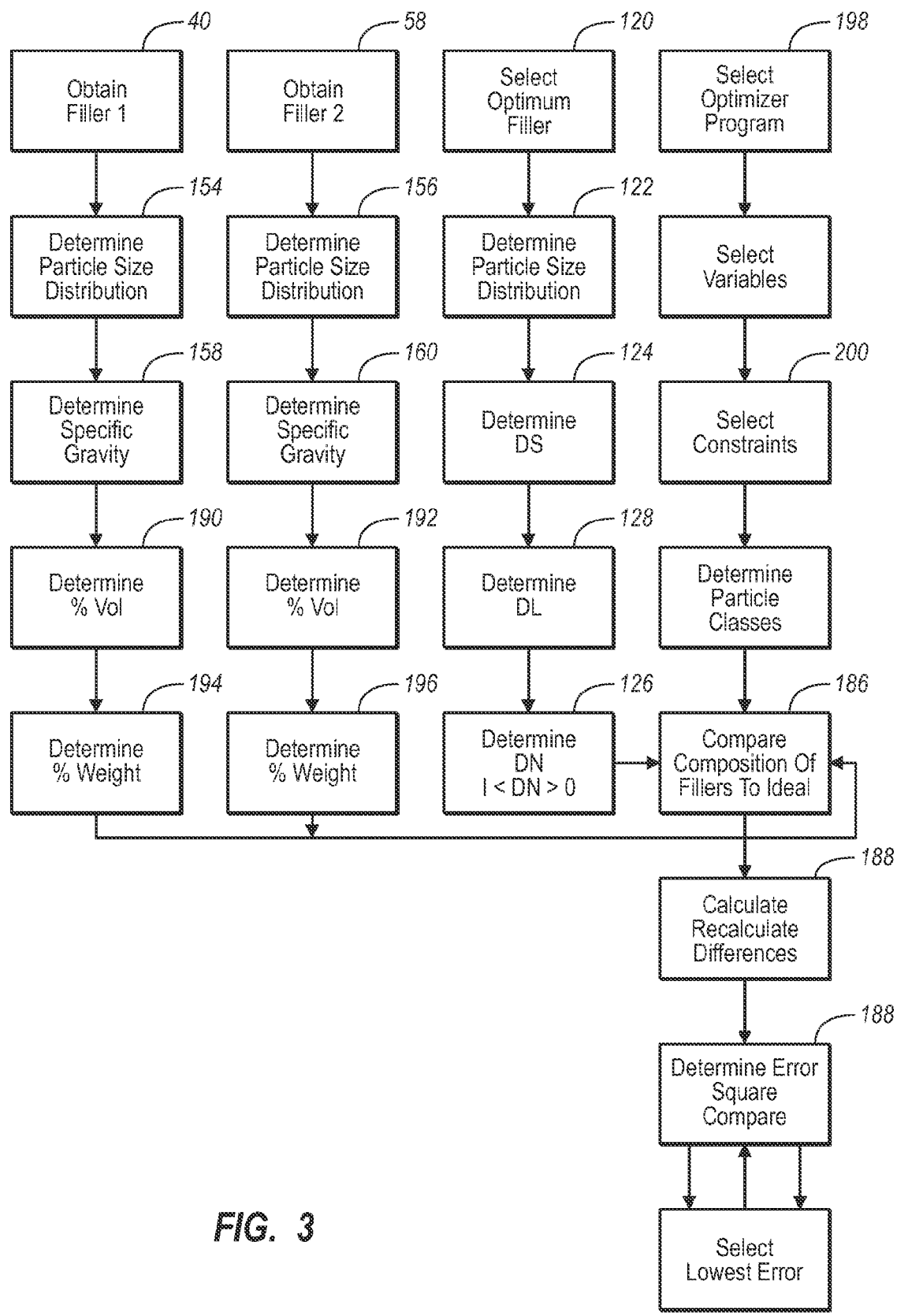
FIG. 3 is a simplified block diagram of the steps of a method for forming a formable composition of the present invention.

The system depicted in FIG. 2 employs a process or method comparable to that of FIG. 3 to optimize the amount of a filler or the amounts of a plurality of fillers used with a selected formable material to form a desired product. A supply of the material 22 is provided for mixing or blending in a hopper 24 as more fully discussed hereafter.

The material 22 in the supply may be any material that can be formed into a suitable product using or incorporating one or more fillers in the production of the product. The material 22 contemplated for use as or in the supply is a plastic of the type that is capable of being formed into a product by any known forming or shaping system (e.g., injection molding, blow molding, vacuum molding, injection molding, extrusion). Plastics of this type are typically found as a solid at standard temperature and pressure (STP) and also at typical room temperatures. Indeed, such plastics typically exist as a solid in the form of chips, granules, flakes, powders, and the like in a normal working environment. Many such materials can be melted to form a liquid at temperatures that vary generally from around 200 degrees Fahrenheit to around 800 degrees Fahrenheit based on the particular plastic. For example, polyethylene has a melting point in the range of about 200 degrees Fahrenheit to about 240 degrees Fahrenheit; and polypropylene has a melting point from about 320 degrees Fahrenheit to about 360 degrees Fahrenheit. In other words, the plastics here contemplated typically soften and tend to flow as the temperature of the plastic rises above a certain level and eventually soften to a usable viscosity.

The material 22 in the source is initially in a solid form such as in the form of chips, granules, powders or pellets. The chips, pellets, powders or granules or other suitable solid forms are sized to allow them to move through suitable pipes or conduits 26 and 28 and through a material meter 30 where a measured amount of the material 22 is dispensed into the hopper 24. In some applications, the material 22 may be granular or a powder so that it can be fluidized and moved as a fluid.

As presently contemplated, the hopper 24 has a heater 31 associated therewith to heat the material 22 and to melt it if necessary. While the material 22 is typically a solid that can be melted as discussed, it should be understood that the material 22 can also be a slurry or even a liquid at room temperature. Thus, heating may only be necessary to maintain the material in a liquid form or to increase the temperature of the material for other reasons.

The system 20 shows the use of fillers that are eventually combined with the material as hereinafter discussed. A wide variety of fillers are known to be in use with plastics as discussed by M. Xanthos, *Functional Fillers For Plastics* (Wiley-VCH 2005). Many times, fillers are selected because they are inexpensive and readily available. Some fillers like glass beads are made specifically for particular uses or applications. Some fillers are specifically selected and even specifically made because of the impact on the physical characteristics (e.g., withstand shear forces, enhance ductility, increase rigidity, contribute to flexibility, increase resistance to fire, control the color, and so on) of the main product. At the same time, it should be understood that many fillers are selected because they are readily available and cheap.

Fly ash is a waste product that is the result of combustion of fossil fuels like coal and oil. Fossil fueled electrical power plants are known to be a source of fly ash. The physical form or composition of the fly ash from a particular power plant is believed to vary not only based on the nature of and conditions of combustion but also based on the kind and source of coal used. Inasmuch as some coals provided vary in composition through out the vein, because some power plants use coal from different mines, and because some power plants use different combustion processes, the composition of the fly ash will vary from batch to batch and also from plant to plant.

While fly ash has been readily available, it has not been adopted as a filler for plastics largely because the composition of the fly ash is not consistent. That is, physical characteristics such as the particle size distribution and chemical composition may vary from source to source and from batch to batch. The present inventions allow one to select and use at least a filler and more particularly, a fly ash, and to mix or blend it with other filler(s) and more particularly, different fly ash(es), each with different or varying composition. That is, the fly ash material from different sources and of different compositions is used in accordance with the disclosed inventions to develop a suitable optimal blend for use with specific resins and other materials to, among other things, reduce viscosity of the liquid material before it is formed into a product. The optimal blend developed may also lead to desired physical characteristics of the final product as well as desired color. That is, the fly ash may also act as a colorant with different fly ash contributing different pigmentation to any resulting final product.

As seen in FIG. 2, Filler A 32 is manually transported from filler receiver 38 to a sifting and sorting device 36 or supplied from the filler receiver 38 by any suitable means like a conveyor or tube 34 to the sifting and sorting device 36. A filler, like Filler A 32, is to be used in commercial quantities for the processes here disclosed preferably has a substantial uniform composition and has certain other preferred physical characteristics. That is, Filler A 32 typically has the appearance of a powder and is comprised of relatively small particles or granules that are typically and generally spherical in shape and sized to be less than about 1000 microns (μm) in diameter or effective diameter. For example, the individual particles of Filler A may all be less than about 1 millimeter in effective diameter and preferably less than 500 microns in effective diameter. The effective diameter is the diameter of the sphere if a particle is a sphere. The effective diameter is an approximate average or median diameter if the particle is of some shape other than a sphere.

The sifting or sorting device 36 sifts, sorts or processes the incoming Filler A 32 into Filler 1 40 which is supplied from the sorting device 36 to the receiver 42. Filler A 32 could be supplied manually by transporting it with a suitable container or through a system having conductor 41. As a result, Filler 1 40 has distribution of particles that are of a particular size range. It is one of several that are available for use and is the one that has been selected for mixing with another. The process of sifting and sorting can be accomplished in several ways including passing the filler through a screen with a particular mesh. That part or those portions of Filler A 32 that do not pass through the mesh size of the screen is either sent to disposal as refuse or is processed in some other way. That is, the material above the mesh size can be disposed of as refuse, used in a different product with more liberal particle size tolerances or processed in a roller machine or general grinder to reduce the larger particles of Filler A 32 to a size it will pass through the screen. While a screen has been described as a suitable tool to sort the Filler A 32, it should be understood that any suitable device or technique can be used so long as the end result is attained. That is, the Filler 1 40 that is formed has certain physical characteristics including a known particle size distribution and a particular specific gravity.

The physical characteristics of the Filler 1 40 in a receiver 42 are determined and confirmed by a particle analyzer 44 that is connected to the receiver 42 to periodically obtain a sample of the Filler 1 40 for analyzing Filler 1 or positioned simply to analyze the Filler 1 40. The particle analyzer 44 analyzes the Filler 1 40 and generates a first composition signal which is delivered to the control means manually or by any suitable means including sending the first composition signal via conductor 48 to the control means like controller 46. The first conductor may in practice be a wireless transmit and receive system and also may be the internet. More specifically, the particle analyzer 44 also operates to detect the particle size distribution (PSD) of the Filler 1 40. The first composition signal sent via conductor 48 includes the PSD data where it is compared with an ideal particle size distribution as discussed hereinafter. A Beckman Coulter LS-230 PSD analyzer has been found to be suitable in this application to evaluate PSD. Of course, it should be apparent that the conductor 48 may be a plurality of conductors and that the particle analyzer 44 may include multiple devices to detect specific gravity and particle size distribution. That is, the particle analyzer 44 and conductor 48 may be configured in other ways so long as the specific gravity and particle size distribution is detected and sent to or delivered to the controller 46. Alternately, other testing devices and methods may be used to meet the ASTM C690 standard for particle size distribution testing.

It is also desired that the specific gravity of a filler like Filler 1 40 be determined and entered into the controller 46. Presently, this is accomplished for each batch of Filler 1 40 by taking a sample and by following certain protocols to determine its specific gravity. The specific gravity can be determined separately by the procedures described in ASTM International standard C 188 or by the American Association of State Highway and Transportation Officials (ASSHTO) standard T133. The controller 46 may be or may include a computer with a typical keyboard to enter data. Thus, the resulting specific gravity manually determined is manually input into the controller 46 by manual input means 47 like a standard computer key board.

FIG. 2 shows a second filler, Filler B 50, in filler receiver 52. The Filler B 50 is either transported manually in a suitable container or supplied by a suitable conveyor, pipe or tube 54 to a device for sifting and sorting comparable to sifting and sorting device 36. It functions in virtually the same way as sifting and sorting device 36 and, in turn, supplies a sorted supply of filler as Filler 2 58 via conduit 60. Alternately, the output of the sifting and sorting device 36 as Filler 2-58 is manually transported to the filler receiver 62 by a suitable container. The Filler 2 58 is contained in a receiver 62 which is also connected to the particle analyzer 44 which also detects the particle size distribution of the Filler 2 58. In turn, the particle analyzer 44 supplies a second composition signal reflective of the particle size distribution of Filler 2 58 via conductor 48 to the controller 46 for further processing as set forth hereinafter. The specific gravity of the Filler 2 58 is also determined manually in the same way as one determines the specific gravity of Filler 1 40. The specific gravity is then entered into the controller 46 by manual input means 47 (e.g., a keyboard).

In FIG. 2, Filler A 32 and Filler B 50 are shown being sifted and sorted by sifting and sorting devices 36 and 56. It should be understood, that in effect the Filler A 32 and Filler B 50 represent a plurality of fillers that can approach and even exceed 15 in number. That is, the system can provide for additional fillers comparable to Filler A 32 and Filler B 50. However, practically it is believed that the system is most effective using two or three fillers. The embodiment being described in FIG. 2 uses Filler A and Filler B that are later transformed into Filler 1 40 and Filler 2 58. However, the use of two fillers in FIG. 2 and in the discussion of the preferred embodiment should not limit the scope of the invention to two fillers.

The controller 46 compares the particle size distribution of Filler 1 40 and Filler 2 58 and compares them to an ideal particle size distribution for an ideal filler as hereinafter discussed. A filler will be deemed ideal if certain physical characteristics are attained either before formation of the product by, for example lowering the viscosity of the melt or by controlling the physical characteristics of the final product when cured or further by controlling the color of the final product. The controller 46 thereupon calculates whether Filler 1 40 or Filler 2 58 is an ideal filler and if not, then it uses the specific gravity of the Filler 1 and Filler 2 58 to calculate how to mix the two to develop a combination that is the optimum filler to best approximate the ideal. The controller 46 thereupon sends a first metering control signal via conductor 65 to a first meter 64 which operates to meter a specified amount of Filler 1 40 to be delivered to a main filler receiver 66 via a conveyor, conduit or pipe 68. Similarly, the controller 46 sends a second metering control signal also via conductor 65 to a second meter 70 which operates to meter a specified amount of Filler 1 58 to be delivered to the main filler receiver 66 via a conveyor, conduit or pipe 72. Alternately, the controller 46 may display the amounts to be mixed as discussed hereinafter. Then the user may measure suitable amounts of the Filler 1 40 and Filler 2 58 to placement manually in the main filler receiver 66. The main filler receiver 66 has a blending device 74 to blend the metered amounts of Filler 1 40 and Filler 2 58 to form the optimum filler 76. The blending device 74 may be an air mixer or a blade mixer. The first meter 64 has a back up filter and a feed back line 77 to return any particles that are undesired for reprocessing by the sifting and sorting device 36. The second meter 70 similarly has a back up filter and a feedback line 78 to return any particles that are undesired for reprocessing by the sifting and sorting device 56. Alternately, the feed back lines 77 and 78 may direct any undesired material filtered out in the first meter 64 and second meter 70 to refuse.

The controller 46 is also connected by conductor 80 to a filler meter 82, to additive meter 84 and to the material meter 30. The controller 46 sends a filler signal to the filler meter 82 to control the amount of the filler blend or optimal filler 76 received from the main filler receiver 66 via conveyor, conduit or pipe 86 that is to be delivered to the hopper 24 via conduit 87 for combination with the material 22. The material meter 30 receives a material control signal via conductor 80 from the controller 46 to meter the amount of material 22 received via conduit 26 from material receiver 88. The material 22 is then supplied via a conduit 28 to the hopper 24. Similarly, the additive meter 84 receives an additive signal from the controller 46 via conductor 80 to supply any one or more additives received from the additive receiver 90 and supplied via conduit 92. The additive meter 84 operates to meter any selected additive that is supplied to the hopper 24 via conduit 94. Alternately, the controller 46 may display on a suitable screen associated with a computer the necessary weight data for a user to be able to weigh out the optimal filler 76, the additives 14 and the material 22 and to manually transport them to the input of a suitable forming means 106.

It should be noted that one additive receiver 90 and one additive meter 84 is shown in FIG. 2. However, multiple additive receivers to hold multiple additives may be provided. For example, any one of several colorants can be added in addition to the fly ash used as a colorant. Alternately or in addition, for example, a tixotrope may be added to thicken as well as various organic salts to thin. In addition, foaming agents may be added to the resulting blend or mixture to control the nature of the product that is eventually produced.

As can be seen in FIG. 2, the hopper 24 is shown with some blades 96 which are driven by a motor 98 via a driveshaft 100. The blades 96 are shown in simple form but are configured as desired to effect a blending and mixing of the optimal filler 76 with the material 22 such as a polyvinylchloride and any suitable additives. Other structures may be used including paddles, screw pumps, to effect the mechanical mixing. At the same time, the composition in the hopper 24 is heated by a heater 31 which is positioned about the hopper 24 to heat the composition (if needed) to and above a melting point. The optimal filler 76 that is selected such as the fly ash filler selected as hereinbefore and hereinafter discussed results in a lower viscosity of the melt 104 in the hopper 24. In turn, the energy to drive the motor 98 is reduced and the amount of electrical energy to drive the motor 98 and operate the heater 31 is notably less. Alternately, the mixture in the hopper 24 may be a powder that is blended and then transported manually to a forming machine where the forming machine processes the mixture into a suitable fluid that is formed into the final desired product.

FIG. 2 also depicts the melt 104 moving from the hopper 24 to a forming device 106. The forming device 106 can be any one of several known plastic forming devices including injection molding machines, roll forming machines, vacuum forming processes and extrusion devices. In FIG. 2, the forming device 106 is an extrusion system having a pump 108 and a forming tool 110 that is typically an extrusion die. With the lower viscosity, the melt 104 is more easily pumped and extruded. The extruding process thus uses less energy to form the product or work piece 112 seen moving on a roller support 114. In addition, the extruding process is thus faster with less wear on the extrusion dies.

A power supply 116 is also seen in FIG. 2 connected to the various components to supply power as needed for operation. For simplicity in illustration, the conductors supplying power are not separately numbered. Those skilled in the art will recognize that suitable power as necessary is to be supplied to those components in need of power.

Referring now to FIG. 3, a process or method of operation of the system of FIG. 2 is depicted. While the steps do not necessarily need to be performed in any particular sequence, it is typical to first select an optimum filler 120 and then determine the characteristics of that optimum filler for use with a particular resin. Empirically, various fly ash products were tested by mixing them into a polymer to determine how the fly ash and resin would perform. In the process, it was determined that the optimum filler for the applications contemplated was a particular fly ash with a specific particle size distribution. Fly ash was selected because fly ash is low cost and readily available. More importantly, a number of different fly ash materials were tested before it was discovered that a particular fly ash did not cause the resulting resin/filler composition or melt to thicken; but rather adding the particular fly ash to the melt thinned it. In other words, the viscosity of the melt was lower after the particular fly ash filler was added rather than the higher as would be expected. In addition, power consumption for the entire process to manufacture a product with the particular fly ash filler was notably less.

A theoretical particle size distribution was selected manually to be the ideal particle size distribution. It was predicted to have a low viscosity when mixed with a suitable resin; and then an actual filler was evaluated from which it was determined to have a low viscosity as predicted by the theoretical particle size distribution.

Figure 1:
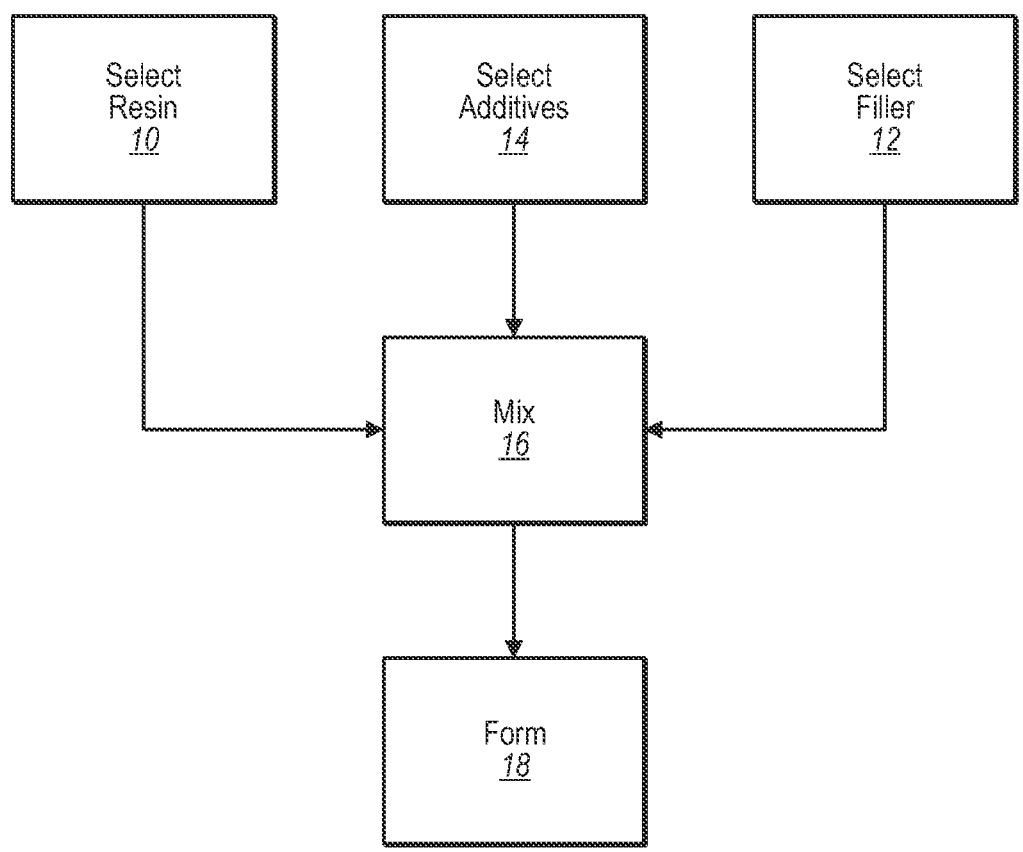
FIG. 1 is a simplified diagram of a prior art system.
Figure 4:
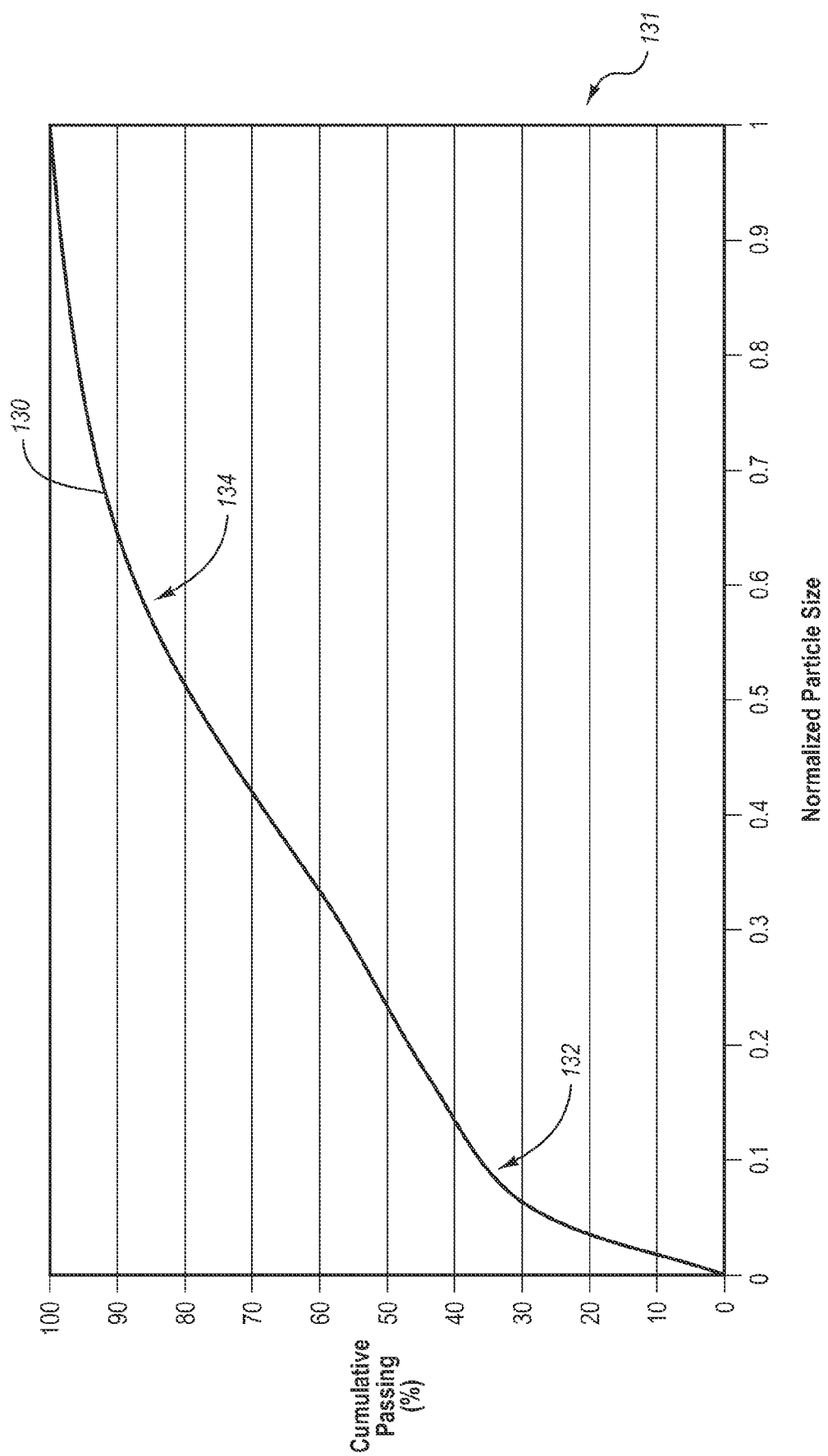
FIG. 4 is a graph of the particle size distribution of an ideal filler for use with a resin.

The ideal particle size distribution was normalized to create the graph or curve 130 as seen in FIG. 4 of the normalized data obtained for each of the particle size classifications 151 as seen in column 180 of FIGS. 5A-1 to 5A-3 using the following equation.

$$D_N = \frac{(D - D_S)}{(D_L - D_S)} \quad \text{Equation 1}$$

In Equation 1 above, the various terms are defined as follows:
$D_S$=diameter of smallest fly ash particle (assumed or actual)
$D_L$=diameter of largest fly ash particle
$D$=particle diameter size of interest
$D_N$=normalized particle size (cumulative passing fraction).

Using Equation 1, normalization is effected by assuming D equals or is the same as $D_S$ 124 (FIG. 3) In that event, $D_N$ 126 will equal zero. At the other end of the spectrum, when $D_L$ 128 is set to equal 1, then $D_N$ 126 equals unity or 1. In this way, no matter how narrow or wide the particle size distribution, the size relationships between different fly ash materials can be more easily perceived and compared. In turn, the cumulative percent of particles passing for the optimal filler can be determined 129 in relation to the normalized particle size which yields curve 130 of graph 131 on FIG. 4.

Before comparing any particle size distribution data of different materials like different fly ash materials, it was first necessary to describe the curve that is the graph of the optimized filler seen in FIG. 4. To do so, the optimized cumulative passing percentage at a particular normalized particle diameter $D_N$ was used to determine a series of coefficients in the following equation:

$$CP\% = \frac{(a + c*D_N + e*D_N^2 + g*D_N^3 + i*D_N^4)}{(1 + b*D_N + d*D_N^2 + f*D_N^3 + h*D_N^4 + jD_N^5)} \quad \text{Equation 2}$$

The constants in Equation 2 are as follows:

| Constant | Value |
|---|---|
| a | −0.00730438 |
| b | −4.41308 |
| c | 445.83362 |
| d | 249.17187 |
| e | 5276.2399 |
| f | −515.53597 |
| g | 1275.2846 |
| h | 687.14627 |
| i | 16906.892 |
| j | −178.3225 |

Also in the equation listed next above, the asterisk (*) is intended to mean multiplication or "times." For the ideal filler or fly ash used, the graph 129 of FIG. 4 has a curve 130 which has a first inflection point 132 and a second inflection point or area 134 that is suggestive of a bimodal configuration seen with fillers other than fly ash and with different particle size distribution. The formula above listed is valid only when $D_N$ is between zero and one. Values of $D_N$ less than zero are assigned the value of zero and those greater than one are assigned the value of one.

As stated before, the physical characteristics (e.g., specific gravity and particle size distribution) of fly ash vary as hereinbefore stated. In turn, the ideal fly ash filler is not readily and widely available. Applicants thus set about to determine ways to make a fly ash filler that performed essentially the same as the ideal filler identified empirically.

In short, a filler must be made to approximate the ideal filler of FIG. 4 and FIGS. 5A-1 to 5A-3 from one or more existing fillers. That is, a filler must be selected for use or created for use that approaches the normalized PSD characteristics of the optimum filler of FIG. 4 with a particle size distribution that appears in FIGS. 5A-1 to 5A.3 as discussed hereinafter. Alternately, a blend of materials must be effected to create a filler that approaches the characteristics of the optimum filler of FIG. 4.

It must also be understood that what constitutes an ideal curve as presented in FIG. 4 will vary with the physical properties to be controlled. While viscosity is being controlled in the system and processes here discussed, in other cases it may be more important to control or obtain or control specific physical properties (e.g., ductility, shear, strength) of the product being formed. In turn, one would empirically develop a curve comparable to the curve of FIG. 4 that would represent the lowest viscosity or the optimum filler for use with selected additives and a selected material to be formed to result in a product having the desired physical properties of the product being produced or the desired properties (e.g., energy consumption) of the process used to produce the product. Once the desired filler or blend of fillers is ascertained, other similar fillers can be evaluated. The particle size distribution and specific gravity of alternates can be calculated and retained. Then steps can be taken to create a blend of materials that approaches the optimum. Similarly, there is a trade off between viscosity of the melt or the material to be extruded and the ability to extrude and the energy used to produce the product.

FIG. 6 is a table showing certain data for each of several different fly ash fillers identified by assigned names and codes in row 142 that were obtained and tested. That is, to select and blend fly ash fillers, or any fillers of general similar physical characteristics, one must obtain and evaluate the composition or physical characteristics of each of the materials 154 (FIG. 3) to determine how they compare and then to determine how to mix or blend them. In FIG. 6, the specific gravity of each of seven fly ash materials is shown in any suitable or desired units in row 136. The specific gravity 158 and 160 (FIG. 3) can be determined separately by the procedures described in ASTM International standard C 188 or by the American Association of State Highway and Transportation Officials (AASHTO) standard T133 the same as was used to determine the specific gravity of the optimum filler of FIGS. 4 and 5. Since there may be hollow particles in the filler, the apparent measured specific gravity may be lower than the actual mineral specific gravity of the filler (e.g., fly ash). Thus, the volume percent is simply calculated by comparing the actual material to the theoretical amount in a particular volume. Because it is difficult to measure materials for mixing by volume, the actual weight percent involved is determined 194 and 196 (FIG. 3). This is simply accomplished by multiplying the % volume by the specific gravity of the material (filler) to determine the number of weight units which can then be converted to weight percent when the total weight units are determined for the optimum blend of two or more fillers. The total weight percent must always equal 100 percent.

It can be seen that each of the various specimens are identified by a sample number in row 142 at the head or top of each column 143 A-G (FIG. 6). The sample number s are assigned for convenience and to identify the source of the material. The particle size distribution of each of the specimens in row 142 of FIG. 6 was determined and is shown as "% Vol" in FIGS. 7A-D which is the cumulative per cent volume passing for each of the particle size classifications 151 of FIGS. 5A-1 to 5A-3 as seen in columns 146-152 in FIGS. 7A-D.

The particle size distribution of each of the samples in row 142 was compared mathematically to the fly ash that resulted in curve 130 for the ideal filler seen in FIG. 4. However, curve 130 is normalized and thus, cannot be compared to actual data. Thus, FIG. 4 is converted to a real data graph that is depicted as curve 174 in FIG. 8. That is, the data for curve 130 is manipulated by the computer selecting real numbers for $D_S$ and $D_L$. For the comparison being made, $D_S$ was set to the number of 0.6210345 microns. The number may range from about 0.04 microns to about 4 micron and reflects the lower practical size of the particles of the ideal fly ash material. $D_L$ was set to the number of 227.58 microns; but it may range from about 50 to about 1000 microns to reflect the largest practical size of the particles of an ideal filler. In the process of running an analysis to determine the optimum % volume and, in turn, the optimum % weight for each of the possible fillers selected, the $D_S$ and $D_L$ numbers will be varied by the program iteratively to with all the calculations described hereafter performed to determine the error between the ideal and the optimum to minimize the error between the ideal mixture and the ideal curve.

Figure 8:
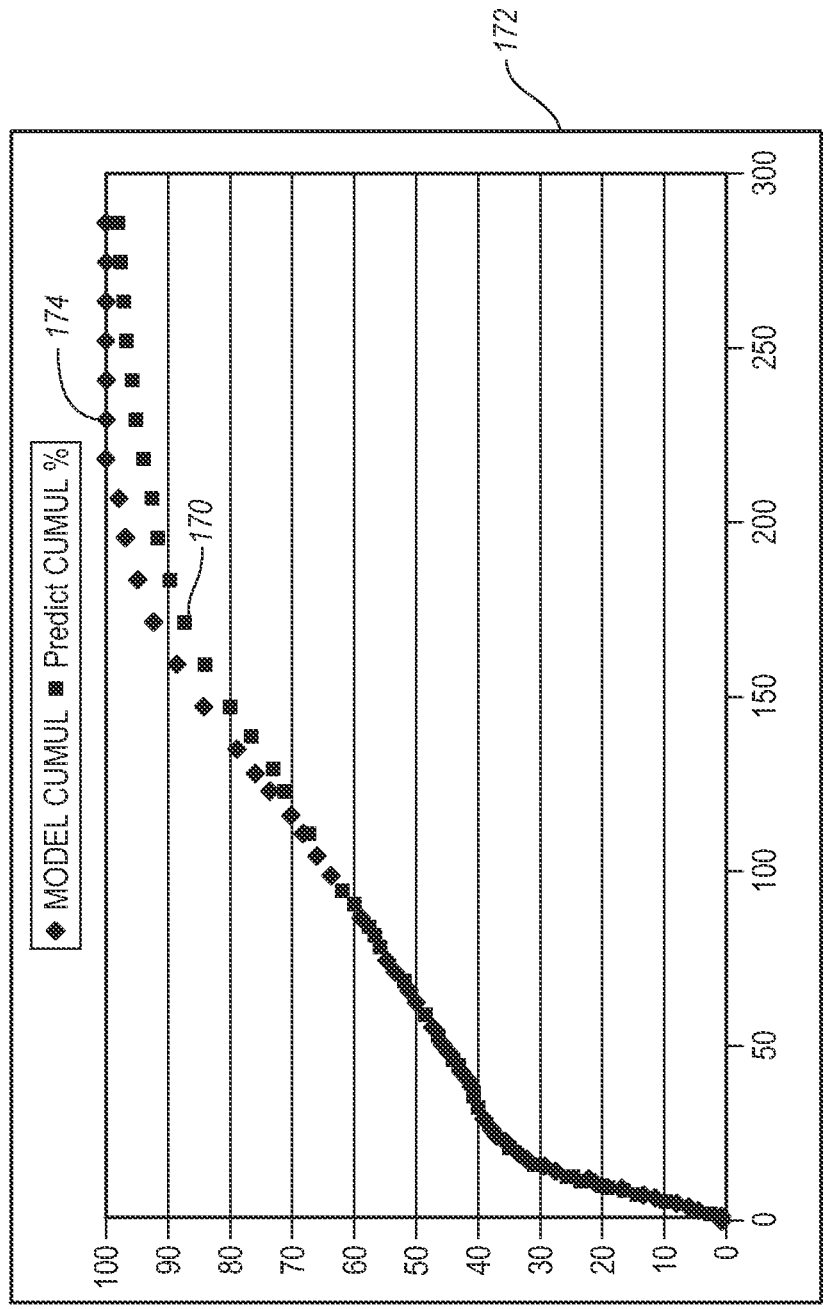
FIG. 8 is a graph showing the predicted particle size distribution of a blended filler in relation to an ideal filler.

In other words, the controller 46 which includes a computer is calculating the error in cumulative volume percent between the sample mixture as it would be graphed and the ideal curve 174 in FIG. 8 that is comparable to curve 130. To do that, the particle size distribution for each of the samples is supplied by the analyzer as % volume passing and then tabulated in columns 146-152 with the % volume being the equivalent of the cumulative % passing. That is, the particle size distribution of Filler 1 40 was first determined from the use of the Beckman Coulter LS 230 which information was retained in the computer in controller 46 as a cumulative per cent volume in column 146 of FIGS. 7A-D. The Beckman Coulter LS 230 analyzer can analyze up to about 150 particle size classifications 145 which are set by the user. The particle size classifications 145 in FIGS. 5A-1 to 5A-3, FIGS. 5B-1 to 5B-3 and 7A-D were picked to approximate a logarithmic scale to facilitate analysis. Similar data was taken and recorded in the computer for each of the samples or fillers identified in row 142 and listed at the top of columns 143 A-G.

The cumulative volume percent was also determined for the ideal filler and is seen in FIG. 8. The normalized data $D_N$ in column 180 of FIGS. 5A-1 to 5A-3 for the ideal filler is calculated using $D_S$ and $D_L$ that are fixed by the computer and are changed iteratively in increments and calculated during the optimization process. The $D_N$ determined in column 180 (FIGS. 5A-1 to 5A-3) (and all iterations thereof) are used to calculate the cumulative percent passing using Equation 2. In column 184 of FIGS. 5A-1 to 5A-3, we see the final results after numerous iterations to minimize the error as hereinafter discussed.

To determine what fillers of the samples available are best to combine, the computer of the controller 46 makes several calculations iteratively until an optimum filler blend is identified. For example, it evaluates at least one and then two or more samples. For the present example, the samples in columns 146 and 152 of FIGS. 7A-D are evaluated for each particle size class appearing in column 150 seen in FIGS. 5A-1 to 5A-3 and FIGS. 7A-D. To do this, first, the optimum volume percent in row 140 of FIG. 6 is multiplied times the cumulative percent volume seen in column 146 in FIGS. 7 A-D for each of the particle size classes of column 145. Similarly, the optimum percent volume in row 140 of FIG. 6 for each of the other samples identified in row 142 of FIG. 6 is multiplied times its cumulative percent volume seen in each of the succeeding columns 147-152 for each of the particle size classes or classifications 145 seen in FIGS. 7A-D. The result for each sample like the samples in column 143A and 143G (FIG. 6) and column 146 and 152 of FIGS. 7A-D are added together for each of the particle size classifications 145 with the sum tabulated and presented in column 186 in FIGS. 5B-1 to 5B-3. The total for each class particle size in column 186 is compared to the cumulative percent volume seen in column 184 of FIG. 5A-1 to 5A-3 that was determined for the ideal filler. The comparison results in an error or a difference for each particle size class in column 145. The error or difference is squared to accent or to create a greater difference. The squared difference appears for each class particle size in columns 188 of FIG. 5B-1 to 5B-3. Column 188 is totaled for each sample and each combination of samples (e.g., sample from column 146 and 152 of FIGS. 7A-D) at each particle size class. The totals yield an error number that reflects the difference between the ideal curve 174 of FIG. 8 and the actual curve 170 of FIG. 8. Thus, the error numbers for each sample and combination of samples are compared to identify a sample filler by itself or the combination of sample fillers with the lowest total difference. The filler or combination of sample fillers is the filler or combination of fillers that will best approximate the ideal curve 174 in FIG. 8. The filler or combination of fillers identified that will produce the lowest error number is the closest to or best approximates the ideal and, in turn, is the optimum filler or optimum combination. Once the filler or fillers are identified, the user then has the weight percentage from row 138 of FIG. 6 available to determine the mixing ratios for the first metering device 64 and second meter 70 (FIG. 2) to lead to the blending of the optimum filler or blend of fillers for use with the material 22.

In practice, it has been found that the data for each of the columns in FIGS. 5A, 5B, 6 and 7A-D are best kept in the EXCEL program 198 (FIG. 3) of Microsoft found in or as part of certain WINDOWS® programs currently available. The EXCEL program includes in some applications the Excel Solver program which is then operated to effect the repeated calculations and to make the comparisons. That is, Excel Solver creates different mixtures of samples to function as Filler 1 40 and Filler 2 58 until a mixture or blend is developed that leads to a curve like curve 170 in graph 172 of FIG. 8 that is about the same as or closely approximates the ideal curve 174 of the ideal filler.

It may also be noted that the Excel Solver program allows one to put other constraints on the solutions 200 (FIG. 3). That is, the program can be instructed to maintain, for example a constant chromatic color index above a number like a Munsel color scale number as seen in row 137 of FIG. 6. Also, it may be noted that the $D_S$ and $D_L$ numbers will be adjusted by the program within suitable ranges to allow greater or lesser optimization in relation to the ideal curve like curve 130 (FIG. 4) and ideal curve 174 (FIG. 8). It should also be noted that the data in FIGS. 5A, 5B and 7A-D may not accurately follow the operations described but are rather reflective of the actual data.

As can be seen in FIG. 6, the combination of the Filler 1 40 from column 143A and Filler 2 58 from column 143G will be easy to meter out or assemble because it will have 55.062% weight of Filler 1 40 blended with 44.938% by weight of Filler 2 58. The result is a filler with a curve 170 on the graph 172 that has a "y" axis in cumulative percent passing in percent for classification points extending from about zero to about 300 microns. Notably, the ideal cure 174 and the curve 170 of the mixture are approximately or nearly the same at or below 70% cumulative passing and very closely the same at or below 90% cumulative passing.

While the process and system described above is useable to select one or to blend two or more fly ash materials, it should also be understood that it may be used to select and to blend three or more samples. Also, it may be used to select and optimize the mixing of filler materials other than fly ash.

EXAMPLE

Two different fly ash blends were mixed with standard Aurora Foam polyvinylchloride (PVC) formulations that contain 8% calcium carbonate ($CaCO_3$). A single screw 2.5 inch extruder pump was used in combination with a co-extrusion Celuka die with a PVC cap. Sample 1 was run with no filler other than the calcium carbonate. Sample 2 used the same PVC with 20% by weight of a blend of fillers having a blend of 17.1% fly ash having a specific gravity of 2.4 with 26.92% of a fly ash having a specific gravity of 2.52 with 56% of a fly ash having a specific gravity of 1.95. Measurements of temperature in the extruder barrel along with pump performance and power requirements were measured and are reported in FIG. 9. Notably, the extruded density of the products are fairly close with Sample 2 producing a product of similar mechanical characteristics to sample 1.

The data of FIG. 9 demonstrates that use of the fly ash filler blend in sample 2 led to notable reductions in energy consumption. The ampere demand and reduced temperatures for the extruder barrel and in the die demonstrate significant reductions in energy consumption and thus, notable reductions in the cost of production.

Figure 10:
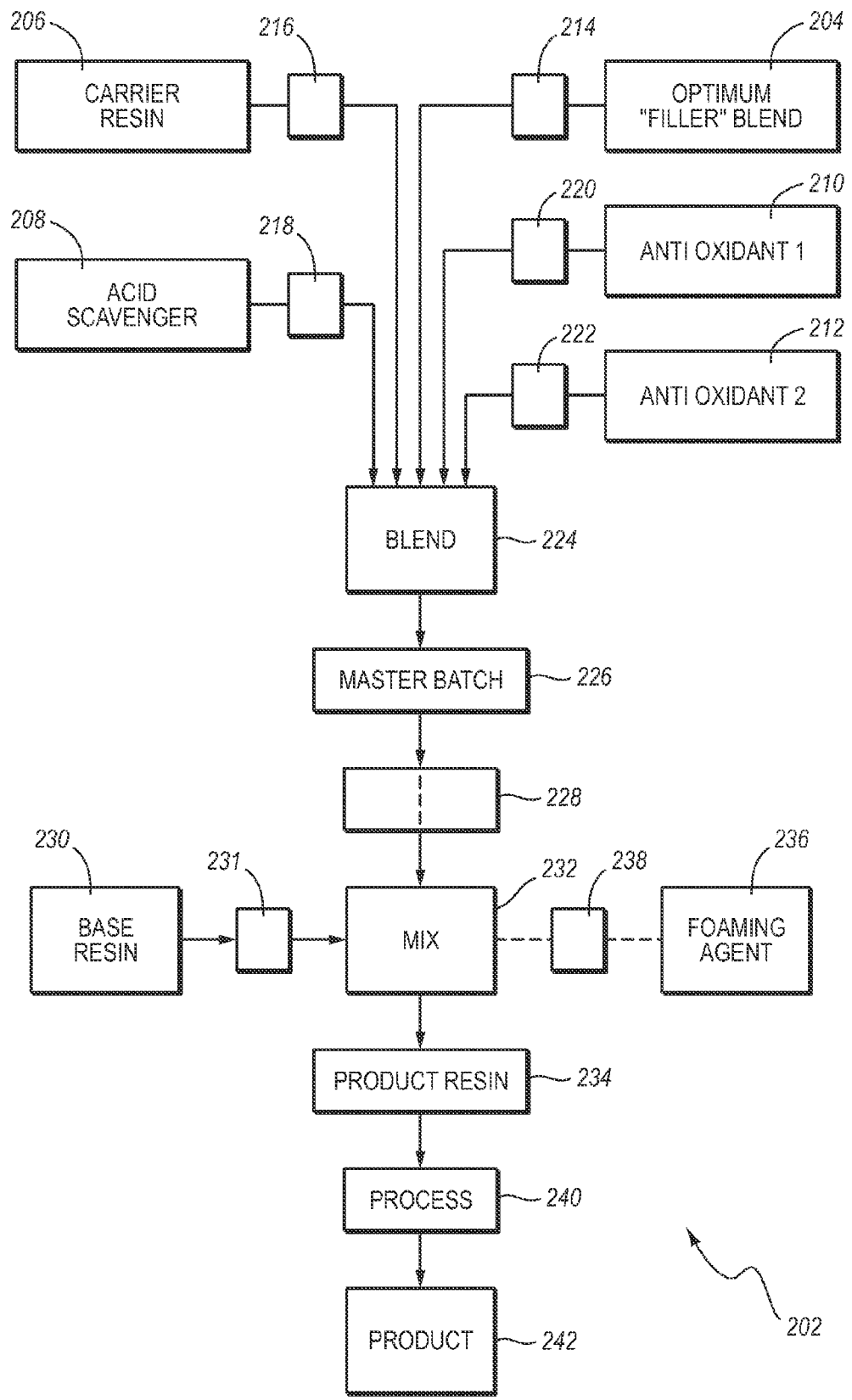
FIG. 10 is a block diagram depicting the flow of materials in a method of the present invention.

Turning now to FIG. 10, a method or process 202 is depicted in which an optimized filler blend 204 is provided. The optimized filler blend 204 may be obtained using any process or procedure to identify and combine fillers as necessary to obtain the optimum blend. For example, those portions of the system of FIG. 2 may be used to obtain optimum filler 76 which in turn may be used as the optimum filler blend 204. Also provided is a carrier resin 206 that is any suitable resin selected for blending or mixing with the optimized filler blend 204 and in turn for carrying the optimized filler blend for use as a resin or for combining with other resins as hereinafter discussed. A suitable acid scavenger 208 and at least one or more anti oxidants 210 and 212 are also provided. The optimum filler blend 204, the carrier resin 206, the acid scavenger 208 and the anti oxidants 210 and 212 are all metered by suitable meters 214, 216, 218, 220 and 222 comparable to metering device 82, 84 and 30 in FIG. 2 and controlled by a controller (not shown) comparable to controller 46 in FIG. 2. In turn, the appropriate amounts may be meters out and supplied to a suitable device for blending 224 to form a master batch 226.

Also as seen in FIG. 10, the master batch 226 may be supplied and in some cases metered 228 for mixing with a base resin 230. That is, the base resin may be metered 231 in a desired amount to be mixed 232 with the master batch 228 to create a product resin 234 that has desired processing characteristics and desired mechanical properties after processing. Optionally, a foaming agent 236 may be metered into the combination of the master batch 228 and the base resin 230 to create a foamable material that is processed 240 by suitable machines into a desired product 242. Additives including, but not limited to colorants, may be used in addition to and in lieu of the foaming agent 236.

In practical application, the optimum filler blend 204 for the method 202 will be a blend that approximates the curve of FIG. 4 or any other curve that has been or will be identified reflecting desired physical properties (e.g., color, elasticity, hardness, deflection) of the finished or end product 242. The carrier resin 206 may be any suitable may be any suitable resin that is particularly suited for mixing with the optimum filler blend 204 and more particularly with a fly ash filler. A medium density polyethylene with a density of 0.936 and a 6 melt index has been found particularly suitable. The acid scavenger is a hydrotalcite; and the first anti-oxidant 210 may be a suitable phenolic antioxidant. The second anti oxidant 212 may be a phosphite. Blending may be effected using a planetary machine, a twin screw, single screw or other batch compound extruder. A Battenfeld Planetary compound extruder (Z series) may also be used as well as a Farrell Compounding Machine such as a model 4, 9 and 15.

The base resin 230 may be any neat (i.e., fresh or first time used) resin, a regrind or any combination of neat and regrind may be selected depending on the desired product, product finish, mechanical properties and the like. For example, it has been found that a suitable High Density Poly Ethylene (HDPE have a 0.96 density and an 8 melt index has been suitable for forming selected final products.

EXAMPLE

A master batch 226 is formed with materials as follows:

TABLE 1

| Item | Name | Amount | Source |
|---|---|---|---|
| Resin | Marlex ® HMN TR 935 or 9235 | 18.80% | Chevron/Phillips |
| Optimum Filler blend | Nano P.E.A. Blend A or B | 80% | Revolutionary Plastics, LLC, Salt Lake City, Utah |
| Acid Scavenger | Hydrotalcite | 0.50% | Akrochem, Akron, Ohio |
| Anti-Oxidant | Phenolic antioxidant (Anox 20) | 0.35% | Chemtura, Seattle |
| | Phosphite (Alkanox 240) | 0.35% | Chemtura, Seattle |

The master batch 226 prepared as set forth in Table 1 is blended 224 using a planetary or other batch compound extruder at a temperature from about 300° F. to 500° F. for a time selected between 2 seconds and three minutes or at about 400° F. if a Battenfeld Planetary Compound Extruder is used. The base resin 230 is a crate resin with a density of 0.96 and with an 8 melt index. About 75% to 80 percent of the crate resins mixed with 20% to 25% of the master batch to produce, for example, an extruded product that has acceptable mechanical properties. The main drive motor is believed to experience about a 1 to about a 75% reduction in power consumption with the processing 240 operating at lower temperatures from 1% to 30% and with lower die pressures of about 1% to about 75%. It has also been noted that with the addition of a foaming agent, the foaming properties are enhanced when a master batch as herein described is in use. The bubbles are finer and greater in number than when existing processes are used. Indeed, the product resin is believed to have greater flowability in the extruding die leading to a decrease of about 10% in the injection time. Faster cooling time after injection can be expected with cooling time being reduced by over 25%. Further, cycle time for injection molding is reduced by 10-30%.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of forming a composite, said method comprising:
supplying an optimized filler material having a particle size distribution selected for attaining desired physical properties of the composite, said optimized filler being comprised of a first fly ash having a first particle size distribution and said second fly ash having a second particle size distribution different from the first particle size distribution of said first fly ash;
supplying a resin adapted for blending with said optimized filler material;
supplying an acid scavenger selected to remove acid;
supplying an anti oxidant; and
blending said optimized filler material, said resin, said acid scavenger and said anti oxidant to form a master batch.

2. The method of claim 1 wherein said resin is a medium density polyethelene.

3. The method of claim 1 wherein said acid scavenger is a hydrotalcite.

4. The method of claim 1 wherein said anti oxidant is one of a phenolic antioxidant and a phosphite antioxidant.

5. A method of forming a composite, said method comprising:
supplying an optimized filler material;
supplying a resin adapted for blending with said optimized filler material;
supplying an acid scavenger selected to remove acid;
supplying an anti oxidant that includes both a phenolic antioxidant and a phosphite antioxidant; and
blending said optimized filler material, said resin, said acid scavenger and said anti oxidant to form a master batch.

6. The product of the method of claim 1.

7. A method of forming a composite, said method comprising:
supplying an optimized filler formed by
providing a first filler and positioning said first filler in a first holding means,
providing first metering means to receive said first filler, said first metering means being operable to meter said first filler,
providing a second filler and positioning said second filler in a second holding means,
providing second metering means to receive said second filler, said second metering means being configured to meter said second filler,
providing analyzing means for analyzing at least particle size distribution of a material;
providing a sample of said first filler to said analyzing means,
operating said analyzing means to analyze said sample of said first filler to determine at least the particle size distribution of said first filler,
providing a sample of said second filler to said analyzing means,
operating said analyzing means to analyze a sample of said second filler to determine at least the particle size distribution of said second filler,
configuring and operating said analyzing means to supply a first composition signal reflective of at least the particle size distribution of said first filler and a second composition signal reflective of at least the particle size distribution of said second filler,
providing control means configured to receive and process said first composition signal and said second composition signal, configuring and operating said control means to effect a comparison of said first composition signal and said second composition signal and combinations of said first composition signal and said second composition signal to the composition of an ideal particle size distribution to determine a first difference between the composition of said first filler particle size distribution and the composition of the ideal filler and to determine the second difference between the composition of the second filler and the composition of said ideal filler, operating said control means to compare said first difference and said second difference and to develop a first metering signal reflective of the first amount of said first filler and a second metering signal reflective of the second amount of said second filler to be blended to result in an optimum filler having a composition best approximating the composition of said ideal filler, supplying said first metering signal to said first metering means to operate said first metering means to meter said first filler material;

supplying said second metering signal to said second metering means to operate said second metering means to meter said second filler material, and mixing said first filler and said second filler with a resin to form said master batch;

supplying a resin adapted for blending with said optimized filler;

supplying an acid scavenger selected to remove acid;

supplying an anti oxidant;

blending said optimized filler, said resin, said acid scavenger and said anti oxidant to form a master batch;

supplying a product resin;

mixing said product resin and said master batch to form a compound; and processing said compound to form a product.

8. The method of claim 7 wherein said resin is a medium density polyethelene, wherein said acid scavenger is a hydrotalcite, and wherein said anti oxidant is one of a phenolic antioxidant and a phosphite antioxidant.

9. The method of claim 7 wherein said anti oxidant includes both a phenolic antioxidant and a phosphite antioxidant.

10. The method of claim 7 wherein said optimized filler is formed by blending a first filler and a second filler.

11. The method of claim 7 further comprising supplying a compounding machine and wherein said optimized filler and said resin, said acid scavenger and said anti oxidant are supplied to said compounding machine, and wherein said compounding machine is operated to blend said optimized filler and said resin, said acid scavenger and said anti oxidant to fowl said master batch.

12. The method of claim 10 wherein said product resin is a high density polyethylene resin.

13. The product of the method of claim 7.

14. The method of claim 7 wherein said first filler is a first fly ash having a first particle size distribution and wherein said second filler is a second fly ash having a second particle size distribution different from said first particle size distribution of first fly ash.

15. A method of forming a composite, said method comprising supplying an optimized filler material which is a blend of a first filler and a second filler;

supplying a medium density polyethelene resin adapted for blending with said optimized filler;

supplying an hydrotalcite as an acid scavenger selected to remove acid;

supplying a phenolic antioxidant and a phosphite antioxidant;

blending said optimized filler, said resin, said acid scavenger and said anti oxidant to form a master batch;

supplying a product resin;

mixing said product resin and said master batch to form a compound; and processing said compound to form a product.

16. The method of claim 15 wherein said master batch is one of a liquid and a powder and wherein said first product is a solid.

17. The method of claim 15 wherein said optimized filler includes a first filler and a second filler different from said first filler.

18. The method of claim 17 wherein said first filler is a first fly ash having a first particle size distribution and wherein said second filler is a second fly ash having a second particle size distribution different from said first particle size distribution of first fly ash.

* * * * *

UNITED STATES PATENT AND TRADEMARK OFFICE
CERTIFICATE OF CORRECTION

PATENT NO. : 8,563,629 B2  Page 1 of 1
APPLICATION NO. : 12/790944
DATED : October 22, 2013
INVENTOR(S) : Prince et al.

It is certified that error appears in the above-identified patent and that said Letters Patent is hereby corrected as shown below:

In the Claims

Claim 11, Col. 17, line 34, "fowl" should be --form--.

Signed and Sealed this
Twenty-sixth Day of August, 2014

Michelle K. Lee
*Deputy Director of the United States Patent and Trademark Office*